United States Patent
Yamaguchi et al.

(10) Patent No.: US 8,424,991 B2
(45) Date of Patent: Apr. 23, 2013

(54) INKJET PRINTING METHOD AND INKJET PRINTING APPARATUS

(75) Inventors: Hiromitsu Yamaguchi, Yokohama (JP); Tsuyoshi Shibata, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 692 days.

(21) Appl. No.: 12/594,475

(22) PCT Filed: Apr. 1, 2008

(86) PCT No.: PCT/JP2008/056502
§ 371 (c)(1),
(2), (4) Date: Oct. 2, 2009

(87) PCT Pub. No.: WO2008/120793
PCT Pub. Date: Oct. 9, 2008

(65) Prior Publication Data
US 2010/0118079 A1 May 13, 2010

(30) Foreign Application Priority Data
Apr. 3, 2007 (JP) .................................. 2007-097712

(51) Int. Cl.
*B41J 29/38* (2006.01)

(52) U.S. Cl.
USPC .............................................. 347/14; 347/54

(58) Field of Classification Search .................... 347/14, 347/56–62, 54
See application file for complete search history.

(56) References Cited

U.S. PATENT DOCUMENTS

| | | | |
|---|---|---|---|
| 5,751,304 A | 5/1998 | Hirabayashi et al. | 347/17 |
| 5,861,895 A | 1/1999 | Tajika et al. | 347/14 |

(Continued)

FOREIGN PATENT DOCUMENTS

| | | |
|---|---|---|
| EP | 1 258 367 | 11/2002 |
| JP | 5-31905 | 2/1993 |

(Continued)

OTHER PUBLICATIONS

Notification Concerning Transmittal of International Preliminary Report on Patentability, the International Preliminary Report and the Written Opinion dated Oct. 15, 2009 in related corresponding PCT Application No. PCT/JP2008/056502.

(Continued)

*Primary Examiner* — Charlie Peng
*Assistant Examiner* — Peter Radkowski
(74) *Attorney, Agent, or Firm* — Fitzpatrick, Cella, Harper & Scinto

(57) ABSTRACT

An inkjet printing apparatus prints by ejecting ink on the basis of image data while scanning a printing head, in which ejection openings for ejecting the ink are arranged, over a printing medium in a direction different from a direction of the arrangement of the ejection openings. The inkjet printing apparatus includes a counting unit for counting the number of ink ejections in a predetermined area among a plurality of areas on the basis of image data for each of the plurality of areas, with the plurality of areas being obtained by dividing, in a main scanning direction, a region over which the printing head scans, and a correction unit for correcting the image data included in the plurality of areas on the basis of the number of ink ejections in each of the plurality of areas. In addition, a printing unit prints by driving the printing head on the basis of the corrected image data. The correction unit corrects image data included in a predetermined area on the basis of an added-up value of the number of ink ejections from an area corresponding to a position where the printing head scans, and printing is implemented to the corresponding predetermined area in the scan direction.

7 Claims, 27 Drawing Sheets

U.S. PATENT DOCUMENTS

| | | | |
|---|---|---|---|
| 5,877,785 A | 3/1999 | Iwasaki et al. | 347/14 |
| 6,116,709 A | 9/2000 | Hirabayashi et al. | 347/14 |
| 6,145,981 A | 11/2000 | Akahira et al. | |
| 6,213,579 B1* | 4/2001 | Cornell et al. | 347/14 |
| 6,278,468 B1* | 8/2001 | Watrobski et al. | 347/14 |
| 6,669,331 B2 | 12/2003 | Teshigawara et al. | 347/43 |

FOREIGN PATENT DOCUMENTS

| | | |
|---|---|---|
| JP | 5-208505 | 8/1993 |
| JP | 7-125216 | 5/1995 |
| JP | 8-156258 | 6/1996 |
| JP | 2003-34021 | 2/2003 |
| JP | 2006-2560009 A | 9/2006 |

OTHER PUBLICATIONS

Japanese Office Action dated Nov. 25, 2011, in related corresponding Japanese Patent Application No. 2007-097712.

International Search Report dated May 1, 2008, in related corresponding PCT Japanese Patent Appln. No. PCT/JP2008/056502.

* cited by examiner

INPUT DATA     1201

| 10 | 10 | 9 | 3 | 0 | 0 | 1 | 8 |
|----|----|---|---|---|---|---|---|
| 12 | 9 | 8 | 10 | 12 | 9 | 6 | 11 |
| 11 | 6 | 5 | 11 | 10 | 15 | 5 | 0 |
| 9 | 7 | 3 | 2 | 9 | 14 | 12 | 0 |
| 4 | 3 | 0 | 1 | 8 | 10 | 5 | 3 |
| 1 | 6 | 9 | 6 | 11 | 9 | 8 | 2 |
| 0 | 4 | 8 | 5 | 0 | 0 | 1 | 5 |
| 0 | 1 | 8 | 9 | 7 | 3 | 2 | 4 |

300dpi×300dpi
64PIXELS (1PIXEL : 4BITS)

FIG.12

THRESHOLD MATRIX MASK

| 1250 | 2891 | 3698 | 1849 | 6883 | 304 | · · · · · · | 1 | 864 | 1301 |
|------|------|------|------|------|------|---|------|------|---|
| 1834 | 87 | 5827 | 944 | 687 | 5510 | | 4013 | 25 | |
| 7620 | 794 | 3453 | 91 | 4287 | 7080 | | 1462 | 157 | |
| 84 | 3015 | 345 | 6531 | 190 | 2258 | · · · · · · | 2443 | 759 | |
| | | | | | | | | | |
| 7036 | 3827 | 519 | 2981 | 0 | 286 | | 627 | 6094 | |
| 2 | 1174 | 846 | 6601 | 3548 | 67 | · · · · · · | 1524 | 45 | |

7680PIXELS (64×120)

FIG.13

BEFORE CHANGE OF DATA

| 10 | 10 | 9 | 3 | 0 | 0 | ...... | 1 | 8 |
|----|----|---|---|----|----|--------|----|----|
| 12 | 9  | 8 | 10| 12 | 9  |        | 6  | 11 |
| 11 | 6  | 5 | 11| 10 | 15 |        | 5  | 0  |
| 9  | 7  | 3 | 2 | 9  | 14 | ...... | 12 | 0  |
|    |    |   |   |    |    |        |    |    |
| 0  | 4  | 8 | 5 | 0  | 0  | ...... | 1  | 5  |
| 0  | 1  | 8 | 9 | 7  | 3  |        | 2  | 4  |

1401

300dpi×300dpi
7680PIXELS(1PIXEL : 4BITS)

ADDED-UP
GRADATION VALUE : 3000

THRESHOLD MATRIX MASK

| 1250 | 2891 | 3698 | 1849 | 6883 | 304  | ...... | 1    | 864  |
|------|------|------|------|------|------|--------|------|------|
| 1834 | 87   | 5827 | 944  | 687  | 5510 |        | 4013 | 25   |
| 7620 | 794  | 3453 | 91   | 4287 | 7080 |        | 1462 | 157  |
| 84   | 3015 | 345  | 6531 | 190  | 2258 | ...... | 2443 | 759  |
|      |      |      |      |      |      |        |      |      |
| 7036 | 3827 | 519  | 2981 | 0    | 286  |        | 627  | 6094 |
| 2    | 1174 | 846  | 6601 | 3548 | 67   |        | 1524 | 45   |

1301

CORRECTION AMOUNT : 300

AFTER CHANGE OF DATA

| 10 | 10 | 9 | 3 | 0 | 0 | ...... | 0 | 8 |
|----|----|---|---|----|----|--------|----|----|
| 12 | 8  | 8 | 10| 12 | 9  |        | 6  | 10 |
| 11 | 6  | 5 | 10| 10 | 15 |        | 5  | 0  |
| 8  | 7  | 3 | 2 | 8  | 14 | ...... | 12 | 0  |
|    |    |   |   |    |    |        |    |    |
| 0  | 4  | 8 | 5 | 0  | 0  | ...... | 1  | 5  |
| 0  | 1  | 8 | 9 | 7  | 2  |        | 2  | 3  |

1402

300dpi×300dpi
7680PIXELS(1PIXEL : 4BITS)

ADDED-UP
GRADATION VALUE : 2700

FIG.14

THRESHOLD MATRIX MASK  2001

| 250 | 1891 | 3698 | 1849 | 1883 | 304 | ・・・・・・ | 3085 | 864 |
|---|---|---|---|---|---|---|---|---|
| 1834 | 87 | 7 | 944 | 687 | 1510 | | 4013 | 2564 |
| 620 | 794 | 53 | 91 | 2287 | 80 | | 1462 | 3157 |
| 84 | 3015 | 345 | 2531 | 190 | 1258 | ・・・・・・ | 6443 | 1759 |
| | | ⋮ | | ⋰ | | | | ⋮ |
| 1036 | 827 | 519 | 2981 | 0 | 286 | | 627 | 6094 |
| 2 | 1174 | 846 | 601 | 3548 | 67 | ・・・・・・ | 1524 | 2445 |

7680PIXELS (64×120)

SMALL NUMBERS APPEAR     LARGE NUMBERS APPEAR
    FREQUENTLY                   FREQUENTLY
←——————— ALLOCATION OF ———————→
              THRESHOLD VALUE

FIG.20

BEFORE CHANGE OF DATA

| 10 | 10 | 9 | 3 | 2 | 0 | ...... | 1 | 8 |
|----|----|---|---|---|---|--------|---|---|
| 12 | 9 | 8 | 10 | 12 | 9 | | 6 | 11 |
| 11 | 6 | 5 | 11 | 10 | 15 | | 5 | 10 |
| 9 | 7 | 8 | 2 | 9 | 14 | ...... | 12 | 8 |
| : | | : | | | | ⋱ | : | |
| 0 | 4 | 8 | 5 | 0 | 0 | | 1 | 5 |
| 0 | 1 | 8 | 15 | 7 | 3 | ...... | 2 | 4 |

2601

300dpi×300dpi
7680PIXELS(1PIXEL : 4BITS)

ADDED-UP
GRADATION VALUE : 40000

THRESHOLD MATRIX MASK  1301

| 1250 | 2891 | 3698 | 1849 | 6883 | 304 | ...... | 1 | 864 |
|------|------|------|------|------|-----|--------|---|-----|
| 1834 | 87 | 5827 | 944 | 687 | 5510 | | 4013 | 25 |
| 7620 | 794 | 3453 | 91 | 4287 | 7080 | | 1462 | 157 |
| 84 | 3015 | 345 | 6531 | 190 | 2258 | ...... | 2443 | 759 |
| : | | : | | | | ⋱ | : | |
| 7036 | 3827 | 519 | 2981 | 0 | 286 | | 627 | 6094 |
| 2 | 1174 | 846 | 6601 | 3548 | 67 | ...... | 1524 | 45 |

CORRECTION
AMOUNT : 9000

AFTER CHANGE OF DATA

| 8 | 9 | 8 | 2 | 0 | 0 | ...... | 0 | 6 |
|---|---|---|---|---|---|--------|---|---|
| 11 | 7 | 7 | 8 | 10 | 9 | | 5 | 9 |
| 10 | 4 | 4 | 9 | 9 | 14 | | 4 | 8 |
| 8 | 7 | 3 | 2 | 7 | 13 | ...... | 11 | 6 |
| : | | : | | | | ⋱ | : | |
| 0 | 3 | 6 | 4 | 0 | 0 | | 0 | 4 |
| 0 | 0 | 6 | 14 | 6 | 1 | ...... | 1 | 2 |

2602

300dpi×300dpi
7680PIXELS(1PIXEL : 4BITS)

ADDED-UP
GRADATION VALUE : 31000

FIG.26

BEFORE CHANGE OF DATA

| 0 | 1 | 9 | 3 | 2 | 0 | ...... | 1 | 8 | 3101
|---|---|---|---|---|---|---|---|---|
| 2 | 9 | 8 | 10 | 12 | 9 | | 6 | 11 |
| 11 | 6 | 5 | 11 | 10 | 8 | | 5 | 10 |
| 9 | 7 | 8 | 2 | 9 | 14 | ...... | 12 | 8 |
| | | | ⋮ | | | ⋱ | ⋮ | |
| 0 | 4 | 8 | 5 | 0 | 0 | ...... | 1 | 5 |
| 0 | 1 | 9 | 15 | 7 | 3 | | 2 | 4 |

300dpi×300dpi
7680PIXELS(1PIXEL : 4BITS)

ADDED-UP
GRADATION VALUE : 60000

THRESHOLD MATRIX MASK    1301

| 1250 | 2891 | 3698 | 1849 | 6883 | 304 | ...... | 1 | 864 |
|---|---|---|---|---|---|---|---|---|
| 1834 | 87 | 5827 | 944 | 687 | 5510 | | 4013 | 25 |
| 7620 | 794 | 3453 | 91 | 4287 | 7080 | | 1462 | 157 |
| 84 | 3015 | 345 | 6531 | 190 | 2258 | ...... | 2443 | 759 |
| | | | ⋮ | | | ⋱ | ⋮ | |
| 7036 | 3827 | 519 | 2981 | 0 | 286 | ...... | 627 | 6094 |
| 2 | 1174 | 846 | 6601 | 3548 | 67 | | 1524 | 45 |

CORRECTION AMOUNT : 6000

AFTER CHANGE OF DATA

| 0 | 0 | 8 | 2 | 2 | 0 | ...... | 0 | 7 | 3102
|---|---|---|---|---|---|---|---|---|
| 1 | 8 | 7 | 9 | 11 | 8 | | 5 | 10 |
| 11 | 5 | 4 | 10 | 9 | 8 | | 4 | 9 |
| 8 | 6 | 7 | 2 | 8 | 13 | ...... | 11 | 7 |
| | | | ⋮ | | | ⋱ | ⋮ | |
| 0 | 3 | 7 | 4 | 0 | 0 | ...... | 0 | 5 |
| 0 | 0 | 8 | 15 | 6 | 2 | | 1 | 3 |

300dpi×300dpi
7680PIXELS(1PIXEL : 4BITS)

ADDED-UP
GRADATION VALUE : 54000

FIG.27

INKJET PRINTING METHOD AND INKJET PRINTING APPARATUS

TECHNICAL FIELD

The present invention relates to an inkjet printing method and an inkjet printing apparatus, and more particularly to an inkjet printing method and an inkjet printing apparatus for printing by causing an inkjet printing head to perform scanning over a printing medium such as a sheet of paper. Still more specifically, the present invention relates to a technique for reducing density unevenness on a printing medium in a main scanning direction.

BACKGROUND ART

An inkjet printing method is to eject inks onto a printing medium for printing from a printing portion including a printing head. When compared with other printing methods, the inkjet printing method has various advantages such as easiness of high definition and high speed printing as well as excellent quietness and inexpensiveness. In recent years, with an increase in the demand of color printing, various types of color inkjet printing apparatuses capable of printing in high image quality comparable to that of the silver halide photography have been developed.

In an inkjet printing apparatus to which such a inkjet printing method is applied, high definition and high speed printing is achieved using a printing head including an ejection portion in which a large number of nozzles are integratedly arranged at a high density. Further, in a color inkjet printing apparatus, a printing head having multiple ejection portions is usually used in order to eject inks with different color tones (colors and densities). A nozzle is herein a term for a combination of an ejection opening through which an ink is ejected; a liquid passage communicating with the ejection openings and an energy generation element which is disposed in this passage or the like and generates energy to be used for the ejection of ink.

For inkjet printing apparatuses, there are a so-called line printer type and a so-called serial printer type. For those widespread in general, the latter one has come to the mainstream. In the latter one, an image is formed by alternately performing main scanning and sub-scanning. In the main scanning, the printing head ejects inks while moving over a printing medium in a direction different from that of the arrangement of ejection openings. In the sub-scanning, the printing medium is moved, relative to the printing head, in a direction perpendicular to that of the main scanning. To achieve further high speed printing, such a serial printer type inkjet printing apparatus is designed to perform bidirectional printing in which a printing operation is performed in both forward main scanning and backward main scanning.

FIG. 1 is a schematic front view showing an example of a configuration of an inkjet printing head (hereinafter, also simply referred to as a printing head) 101 which is used in an inkjet printing apparatus of the serial printer type. This printing head 101 includes multiple ejection portions 102 enabling the ejection of inks with different color tones. In the example shown in the drawing, four ejection portions 102 are provided corresponding to, for example, four colors of inks, i.e., inks of black (K), cyan (C), magenta (M), and yellow (Y).

In each ejection portion 102, nozzles 103 each including an ejection opening 103A and a liquid passage 103B are disposed at predetermined intervals on both sides of an ink supplying passage 105 opened in a substrate 100. The nozzle arrays are disposed to have a relationship in which the nozzles in one of the nozzle arrays are shifted from the nozzles in the other nozzle array by half a pitch, thereby achieving resolution twice as high as that achieved by each nozzle array alone. To the liquid passage 103B, a heater (not shown) which generates thermal energy in response to, for example, electrification is provided as an energy generation element. This heater rapidly heats an ink and thereby evaporates the ink. With pressure due to a bubble thus generated, the ink is ejected through the ejection opening 103A, for example, as a droplet. The generated bubble is cooled with the surrounding ink and, thereby, vapor of the ink inside the bubble is condensed back into liquid. Thus, the bubble eventually disappears. At this time, an amount of ink corresponding to that consumed for the ejection is refilled into the liquid passage 103B through the ink supplying passage 105.

FIG. 2 schematically shows a configuration of a main part of the inkjet printing apparatus using the foregoing printing head. In this figure, reference numerals 201 denote ink tanks of cartridge type respectively containing the above-described four colors of ink, and the ink tanks 201 are independently and detachably attachable to the printing head 101 including the foregoing four ejection portions 102.

Reference numeral 206 denotes a carriage which performs the reciprocating movement (this movement is referred to as a main scanning or a scan, and a direction of the reciprocating movement is also referred to as a main scanning direction) in an X-direction and its opposite direction of the drawing of FIG. 2 while supporting the printing head 101 and the four ink tanks 201. Reference numeral 203 denotes a conveying roller. This conveying roller 203 rotates in the direction of an arrow of FIG. 2, while nipping a printing medium P with the auxiliary roller 204, so that the printing medium P is intermittently conveyed (sub-scanning) in the Y direction at intervals between the main scanning operations. Reference numerals 205 denote a pair of paper-feeding rollers for feeding the printing medium. As in the case of rollers 203 and 204, the pair of rollers 205 rotate while nipping the printing medium P therebetween. At this time, a tensile force is created in the printing medium by setting a rotating speed of the rollers 205 to be lower than that of the conveying roller 203, so that the printing medium can be conveyed without slack.

The carriage 206 waits at a home position h shown in a dashed line of FIG. 2 when a printing operation by the printing head 101 is not performed, or when a recovery operation for the printing head 101 is performed.

Further, once a print start instruction is given, the carriage 206 staying at the home position h before a start of printing is scanned in a forward direction (X-direction), while causing the printing head 101 to perform an ejection operation from the nozzles, thereby printing a certain swath corresponding to a nozzle arrangement range. Once the main scanning up to an end of the printing medium is completed, the printing medium P is conveyed by an amount equivalent to the swath, and at the same time, the carriage 206 is returned to the home position h to perform again the main scanning in the X-direction for making printing. In this manner, the printing for one swath by using the printing head 101 in a single main scanning of the carriage 206, and the conveying of a printing medium by an amount equivalent to one swath after the single main scanning are repeatedly performed, so that, for example, one page printing can be completed. In this case, one printing region on the printing medium P is completed with one-time main scanning, and such a printing mode is referred to as a one-pass printing mode.

In contrast, in some cases, instead of performing the conveying by an amount equivalent to a swath for each single main scanning, the conveying is performed after the main scanning is performed multiple times. Alternatively, in other some cases, an image is completed by performing multiple times of main scanning and conveying and by involving different nozzles with printing for a single image region. More specifically, the multiple times of main scanning and conveying include: performing printing based on data thinned out by a predetermined mask in each main scanning; performing the conveyance of printing medium by an amount equivalent to 1/n swath; and then performing the next main scanning again. The printing mode described above is referred to as multipass printing. That is, this multipass printing mode is a printing mode in which inks are applied to a single image region in multiple times to complete an image, and it is known in general that the larger the number of passes, the better the printing quality.

Unidirectional printing has been described above in which a printing operation is performed only at the time of moving the carriage 206 in the forward direction; however, bidirectional printing can also be performed in which a printing operation is performed also during the backward direction movement when high-speed printing is performed.

In a case of adopting an inkjet printing method using thermal energy to perform an ink ejection, a uniform and continuous drive of a heater causes rise in temperatures of a printing head and ink. It is known that such temperature rise lowers the viscosity of the ink, and thereby causes a larger amount of ink to be ejected even by the driving under the same condition, which creates density unevenness.

The reduction of density unevenness is important to perform high quality printing. As typical means for achieving this reduction, there is means for controlling an ejection amount so that the ejection amount may be constant, or means for correcting data for printing, themselves. Further, as means for reducing density unevenness, there are known a technique using the above mentioned multipass printing, or a technique by reducing a drive frequency of the heater or the speed of the main scanning although such reduction causes a decrease in recoding speed.

Here, when the same drive pulses are applied to a heater, an ejection amount from a printing head depends on the temperature of an ink in the vicinity of the heater. Therefore, the management of temperature of the ink is strongly desired, but this is difficult in practice. For this reason, a currently-widespread technique for controlling an ejection amount from a printing head is targeted to control the temperature of the printing head instead of the ink temperature.

For example, Patent Document 1 discloses a technique in which a sensor for the detection of the temperature inside a printing head is disposed in the printing head, and an output of this sensor is monitored to modulate a drive pulse. More specifically, a control method (PWM control) has been proposed in which once the temperature rises, a period of drive time (heating time) of a heater is reduced by changing a pulse width of a pulse signal for driving the heater or by performing a similar operation, whereby a rise in temperature of the head is restrained to cause an ejection amount of ink to be constant.

However, the sensor is attached in the vicinity of the head, and a precise output is not capable of being monitored with an MPU (CPU) due to a noise caused by a drive of the printing head, so that there have been problems that a precise temperature control is not capable of being made, and the controlling of an ejection amount is not sufficient. In this connection, besides the configuration in which a temperature sensor is provided to a printing head, use of a technique has been proposed which includes an amplification mechanism of a detected temperature output, a measure against noise for a detection result, and the like. However, this increases cost by that much. Accordingly, in light of the reliability of a sensor, a technique has been proposed in which the temperature of the printing head is estimated on the basis of image data to be printed, and it has also been proposed that this technique is substituted for or is used along with the technique for detecting temperature. For example, prior to a main scanning, image data for a single main scanning are temporarily stored in a memory area such as an image buffer; the number of valid data in the image buffer are counted; and a change in the temperature of the head is estimated using the count result. Then, the modulation of a pulse width of a drive signal, or the like is performed to thereby perform a main scanning.

Further, as disclosed in Patent Documents 2 and 3, there is a technique in which a temperature is acquired using means for acquiring a temperature around a printing apparatus or a printing head by using a sensor or the like, and means for estimating a temperature rise of an inkjet head on the basis of an amount of heat inputted into the printing head per unit time.

Further, in recent years, it has been strongly desired that a high-precision technique be used over a conventional estimation method, because of an increase in an ejection frequency with the increase of a printing speed, and of an increase in the number of nozzles per nozzle array. High precision temperature estimation is achieved by shortening time intervals for a temperature estimation calculation, but the shortening of the time intervals increases a calculation load on a printing apparatus. Thus, it becomes necessary to improve the capability of an MPU (CPU) being a calculation unit, or decrease in throughput occurs.

For these problems, Patent Document 3 discloses, as a temperature estimation method having a less calculation load with a high accuracy, a technique in which the temperature of a printing head is estimated on the basis of a drive condition of the printing head, and depending on this estimated temperature, the foregoing PWM control is performed, so that a precise control on an ejection amount is performed. More concretely, the drive condition of the printing head is converted into an amount of input heat to be stored in the printing head, and the storage of heat after the radiation of heat due to the elapse of unit time is calculated using heat in the printing head stored up to the last main scanning. Thereafter, the storage of heat of the printing head is stored for each thermal time constant, and each amount of input heat and an amount of heat after heat radiation are added, so that a temperature rise of the printing head is calculated.

On the other hand, Patent Document 4 discloses a technique in which, in a printing apparatus performing a print on a large-sized printing medium, a temperature estimation and an ejection amount control are performed in real-time using image data. More concretely, disclosed are: a technique in which valid data in image data are counted, and when the count value attains a predetermined value, the width of a pulse signal for driving the head is changed, or print data are thinned out by a predetermined amount to correct data and the corrected data are printed.

In recent years, with the spread of personal computers and digital cameras, it has been strongly requested that further high definition and further speeding-up on printing is performed in printing apparatuses serving as image output terminals. For the inkjet printing apparatuses, to cope with the request on the high definition printing, one has come out in which, to make printing, dots with small diameters are formed using a printing head densely equipped with finer nozzles through which smaller amounts of ink are ejected. In performing printing using such an inkjet printing apparatus, the number of ink dots with which a printing region is covered has a large influence on the size of the printing region.

This will be explained using FIGS. 3A and 3B. Let us suppose that there are a printing head forming a dot shown in FIG. 3A, and another printing head simply with a half the dot diameter in FIG. 3A, as shown in FIG. 3B. In this case, in order to perform printing on the same printing area, the number of dots disposed in each of the longitudinal and lateral directions is twice as many as that of dots of FIG. 3A, and thus, the total number of dots disposed in FIG. 3B is four times as many as that of the case of FIG. 3A. Therefore, when a printing head forming dots such as those in FIG. 3B is driven under the same condition as that for another printing head forming dots such as those in FIG. 3A, it is natural that the printing speed is extremely low.

To avoid the reduction of the printing speed, applied are: a method in which an ink ejection frequency (a drive frequency of a heater) and the speed of a main scanning are increased, and a method in which the number of passes is reduced in performing multipass printing.

However, an increase in the drive frequency of the heater causes a rise of the temperature of the printing head to be marked, resulting in density unevenness due to an increase of the ejection amount. Further, with dots having a small diameter, the number of dots printed on a printing region also increases, so that the density unevenness is further visible due to increase in the ejection amount of each nozzle. Still further, when the next main scanning is performed with the temperature of the head remaining high due to the previous one-time main scanning, the ejection amount increases to a level higher than the level of any previous ejection amount, and density unevenness occurs for each main scanning. In addition, even if the number of passes is reduced, the number of ink dots formed in one-time main scanning increases and therefore, in such a case also, an increase of the ejection amount due to an increase of the temperature of the printing head causes density unevenness on a printing region. Further, when the drive frequency improvement and the pass number reduction are performed at the same time, it is natural that the influence thereof becomes considerably large.

Under such circumstances, a control which involves the detecting of the temperature of the printing head using a temperature sensor as conventional has a problem in responsiveness. In addition, the increase in the ejection frequency results in reduction in maximum pulse width in one ejection timing. Therefore, when the detection of the temperature of the printing head is performed, or when the temperature estimation is performed on the basis of data to be printed, a controllable range of the ejection amount in a modulatable range of a pulse width is narrowed, so that controlling capability becomes insufficient.

Furthermore, especially, in a case of performing high speed printing, such as the case where bidirectional printing is applied in a one-pass printing mode, density unevenness may occur even within a region for a single main scanning.

This will be described with reference to FIG. 4. For example, consider the case where bidirectional printing is performed in the foregoing one-pass printing mode. In such a case, a density distribution comes up in the main scanning direction on a region on which printing is performed for each main scanning. To be more specific, a band-like density unevenness occurs for each main scanning, and especially, the density increases from a start portion of each main scanning toward an end portion thereof.

FIGS. 5A, 5B, and 5C are schematic views respectively showing a state of a printing region on which a "solid" image having the same gradation has been printed in an arbitrary main scanning in one-pass printing mode, the temperature of a printing head at that time, and an ejection amount at that time. With the progress of printing in the main scanning direction by the printing head, the temperature Th of the printing head increases as shown in FIG. 5B, and with this increase in the temperature, the ejection amount Vd also increases as shown in FIG. 5C. As a result, as shown in FIG. 5A, density unevenness occurs in a direction along the main scanning direction.

None of the conventional techniques disclosed in Patent Documents 1 to 4 enables the controlling of effectively suppressing such density unevenness.

Patent Document 1: Japanese Patent Laid-Open No. H 5-31905 (1993)
Patent Document 2: Japanese Patent Laid-Open No. H 5-208505 (1993)
Patent Document 3: Japanese Patent Laid-Open No. H 7-125216 (1995)
Patent Document 4: Japanese Patent Laid-Open No. H 8-156258 (1996)

DISCLOSURE OF THE INVENTION

A first aspect of the present invention has been made to solve the above-described problems, and an object thereof is to effectively suppress the occurrence of density unevenness in the main scanning direction by reducing an increase in the ejection amount due to a temperature increase of a printing head, with both demands of further high definition and further speeding up of printing being achieved.

In this connection, in the present invention, there is provided an inkjet printing method for performing printing by ejecting ink on the basis of image data while scanning a printing head, in which ejection openings for ejecting the ink are arranged, over a printing medium in a direction different from a direction of the arrangement of the ejection openings, the inkjet printing method comprising:

a correction amount acquisition step of acquiring an amount of correction for a predetermined area among a plurality of areas on the basis of image data for each of the plurality of areas, the plurality of areas being obtained by dividing, in a main scanning direction, a region over which the printing head scans;

a correction step of correcting the image data to be printed within the predetermined area on the basis of the amount of correction for the predetermined area; and a printing step of performing printing on the basis of image data after the correction, wherein in the correction step, multivalued image data values respectively for a plurality of pixels included in the predetermined area are corrected on the basis of the amount of correction for the predetermined area.

In a second aspect of the present invention, there is provided an inkjet printing apparatus which performs printing by ejecting ink on the basis of image data while scanning a printing head, in which ejection openings for ejecting the ink are arranged, over a printing medium in a direction different from a direction of the arrangement of the ejection openings, the inkjet printing apparatus comprising:

a correction amount acquisition unit for acquiring an amount of correction for a predetermined area among a plurality of areas on the basis of image data for each of the plurality of areas, the plurality of areas being obtained by dividing, in a main scanning direction, a region over which the printing head scans;

a correction unit for correcting the image data to be printed within the predetermined area on the basis of the amount of correction for the predetermined area; and a printing unit for performing printing on the basis of image data after the correction, wherein the correction unit corrects multivalued image data values respectively for a plurality of pixels included in the predetermined area on the basis of the amount of correction for the predetermined area.

In a third aspect of the present invention, there is provided a printing system including an inkjet printing apparatus which performs printing by ejecting ink on the basis of image data while scanning a printing head, in which ejection openings for ejecting the ink are arranged, over a printing medium in a direction different from a direction of the arrangement of the ejection openings, the printing system comprising:

a correction amount acquisition unit for acquiring an amount of correction for a predetermined area among a plurality of areas on the basis of image data for each of the plurality of areas, the plurality of areas being obtained by dividing, in a main scanning direction, a region over which the printing head scans;

a correction unit for correcting the image data to be printed within the predetermined area on the basis of the amount of correction for the predetermined area; and a printing unit for performing printing on the basis of image data after the correction, wherein the correction unit corrects multivalued image data values respectively for a plurality of pixels included in the predetermined area on the basis of the amount of correction for the predetermined area.

In a fourth aspect of the present invention, there is provided a control method for an inkjet printing apparatus which performs printing by ejecting ink on the basis of image data while scanning a printing head, in which ejection openings for ejecting the ink are arranged, over a printing medium in a direction different from a direction of the arrangement of the ejection openings, the control method comprising:

a correction amount acquisition unit for acquiring an amount of correction for a predetermined area among a plurality of areas on the basis of image data for each of the plurality of areas, the plurality of areas being obtained by dividing, in a main scanning direction, a region over which the printing head scans; and a correction step of correcting the image data to be printed within the predetermined area on the basis of the amount of correction for the predetermined area, wherein the correction unit corrects multivalued image data values respectively for a plurality of pixels included in the predetermined area on the basis of the amount of correction for the predetermined area.

In accordance with the present invention, the count and correction of image data within a single main scanning region enables a reduction of density unevenness in the same direction as the main scanning direction over a printing region, the variation occurring due to an increase in the ejection amount caused by a temperature increase of a printing head due to ink ejection. This makes it possible to perform high speed printing with deterioration in image quality being lessened.

BRIEF DESCRIPTION OF THE DRAWINGS

FIG. 12 is an explanatory view schematically showing multivalued input data corresponding to data on an arbitrary region of print data in the first embodiment of the present invention;

FIG. 13 is an explanatory view showing a threshold matrix mask to be used for correcting print data in the first embodiment of the present invention;

FIG. 14 is an explanatory view schematically showing a process for changing gradation values of input data in accordance with an order of values of the threshold matrix in the first embodiment of the present invention;

FIG. 20 is an explanatory view showing a further example of a threshold matrix mask to be used for correcting print data in the first embodiment of the present invention;

FIG. 26 is an explanatory view schematically showing a process for changing gradation values of input data in accordance with an order of values of a threshold matrix in the Example 1; and FIG. 27 is an explanatory view schematically showing a process for changing gradation values of input data in accordance with an order of values of a threshold matrix in an Example 3.

BEST MODE FOR CARRYING OUT THE INVENTION

The present invention is described in detail below with reference to the accompanying drawings.

1. An Example of a Configuration of a Control System

Figure 1:
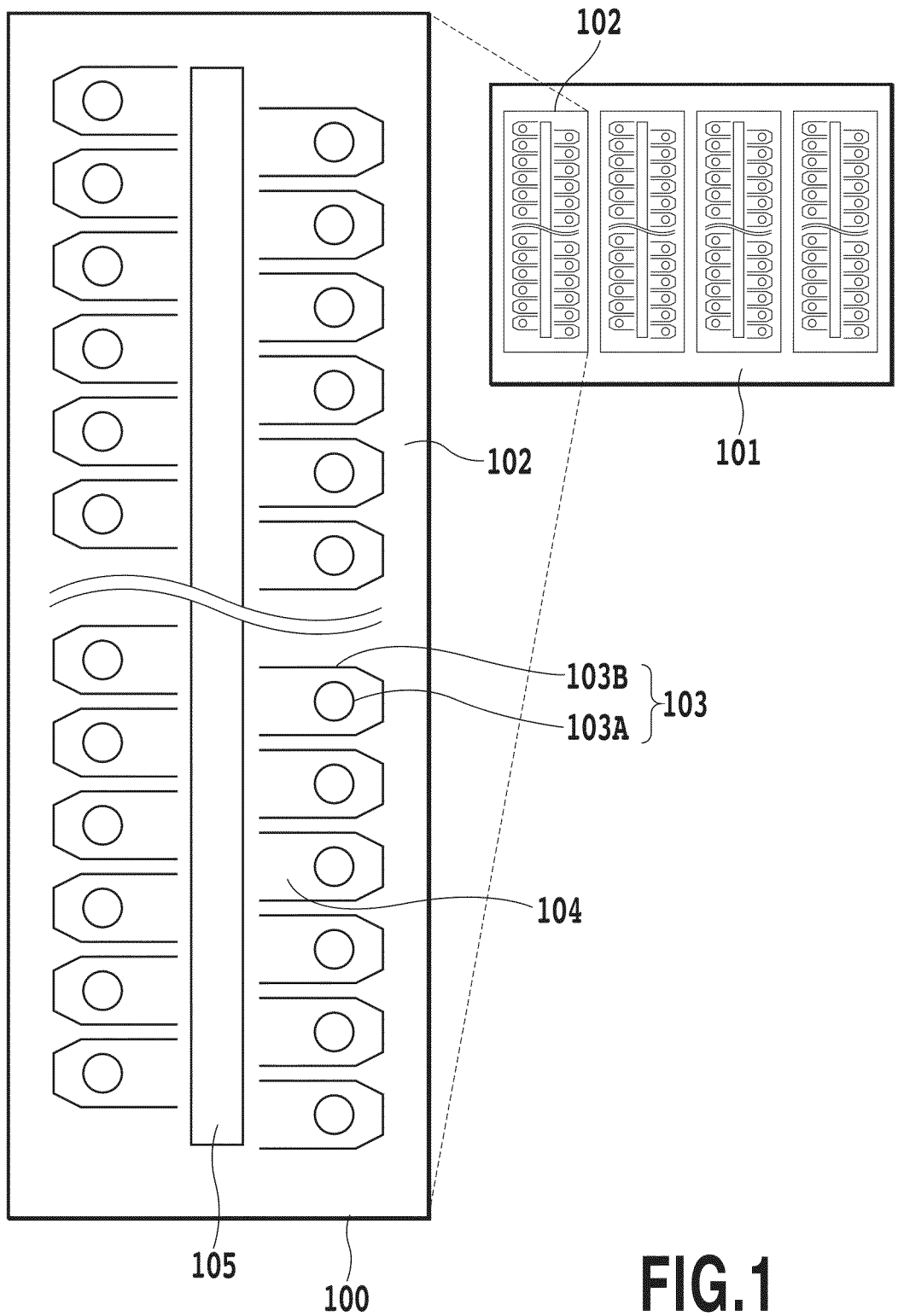
FIG. 1 is a schematic front view showing an example of a configuration of a printing head which is used in an inkjet printing apparatus of the serial printer type.
Figure 2:
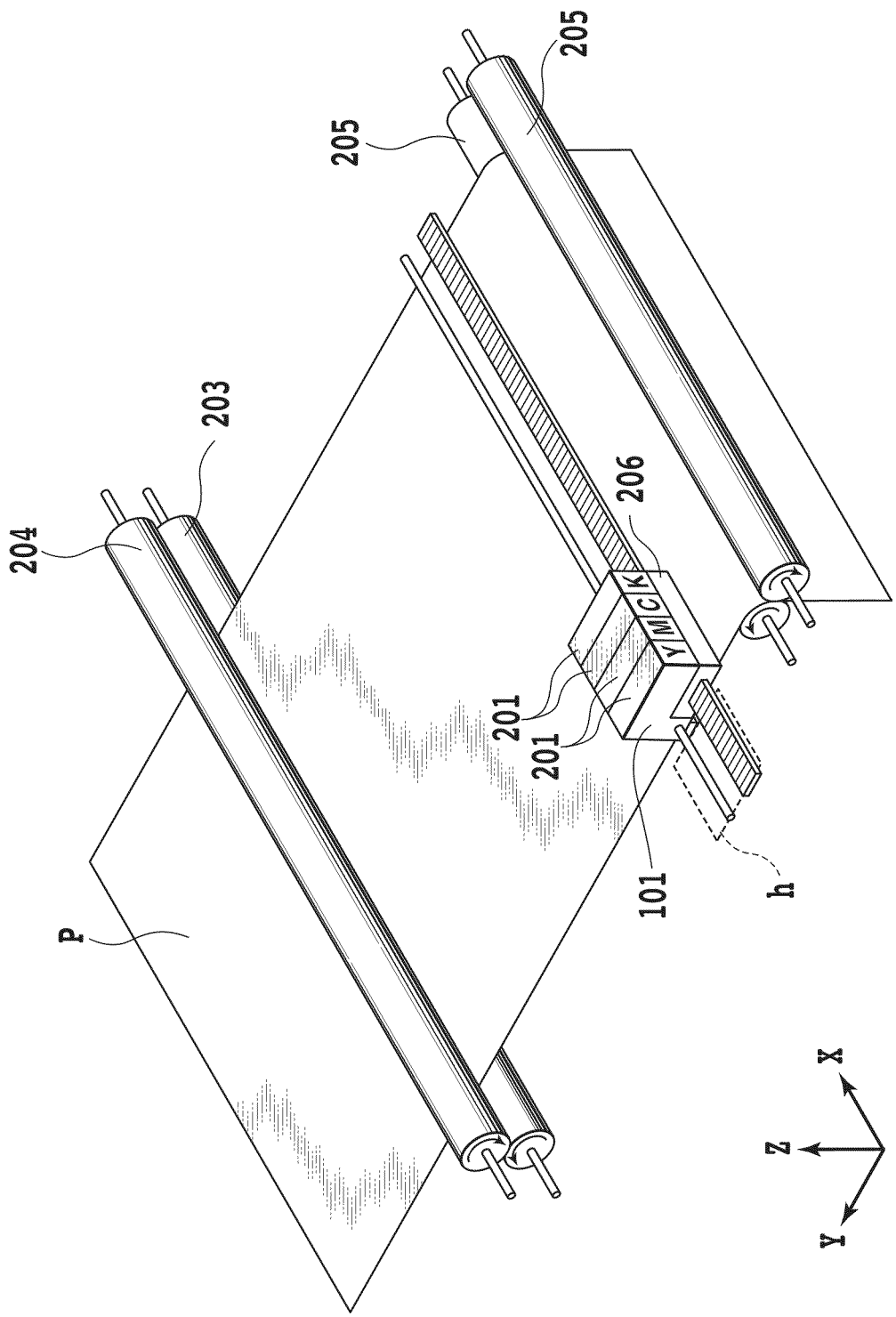
FIG. 2 is a schematic perspective view showing a configuration of a major portion of the inkjet printing apparatus using the printing head of FIG. 1.
Figure 3A:
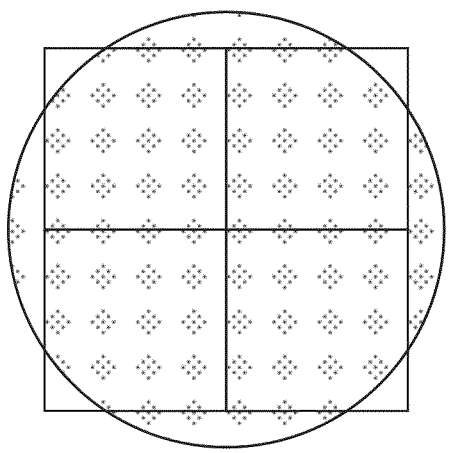
FIG. 3A is a schematic view for explaining that the numbers of ink dots covering a printing region differ from each other depending on the difference between the diameters of ink dots, and shows the case where the diameter of dots is comparatively large.
Figure 3B:
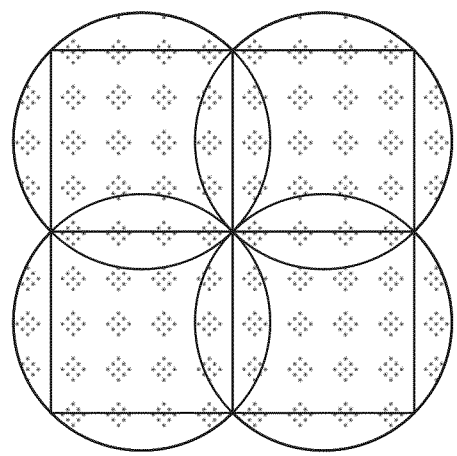
FIG. 3B is a schematic view for explaining that the numbers of ink dots covering a printing region differ from each other depending on the difference between the diameters of ink dots, and shows the case where the diameter of dots is comparatively small.
Figure 4:
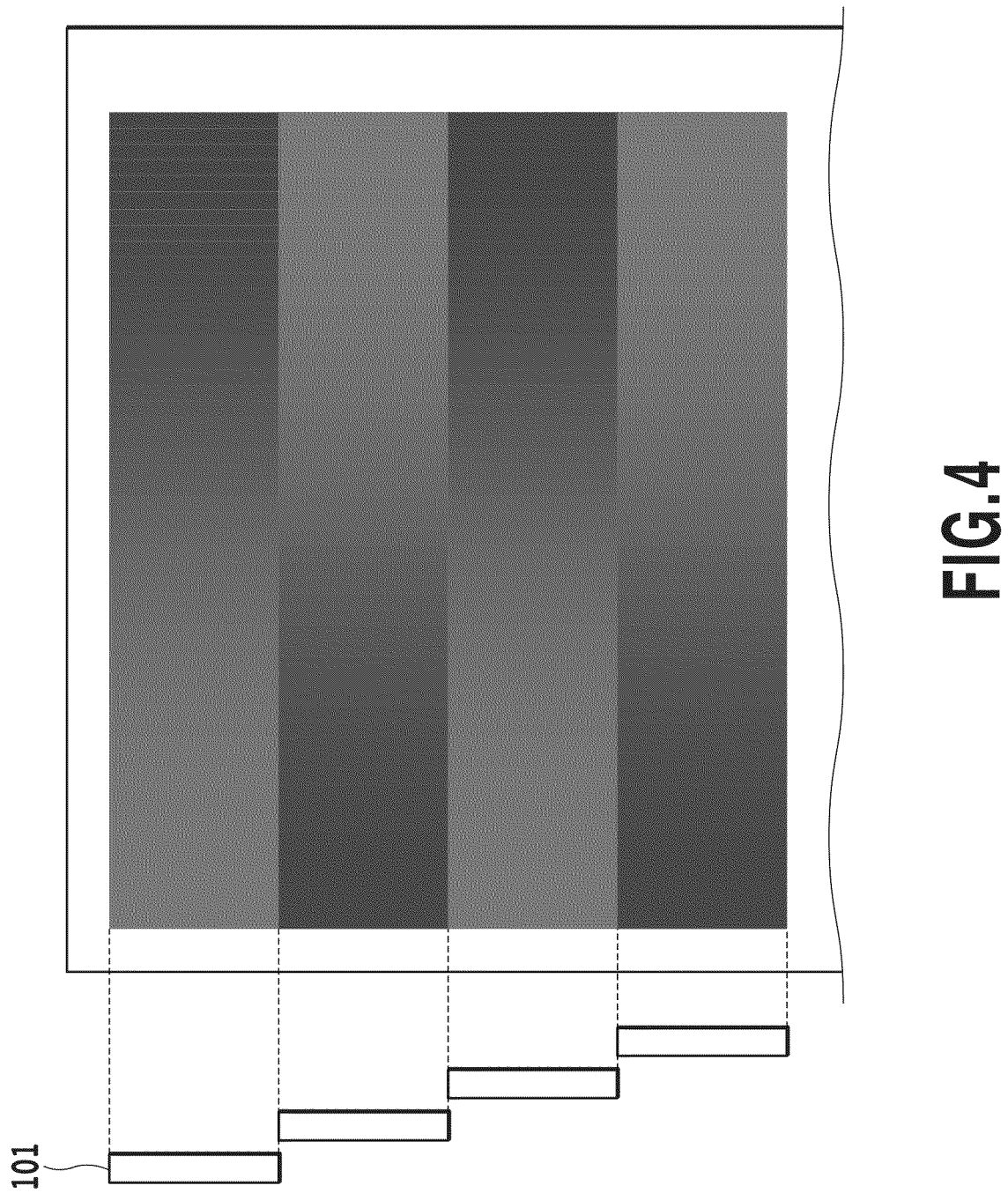
FIG. 4 is an explanatory view for explaining density unevenness occurring in the main scanning direction in performing a uniformly continuous drive on the printing head.
Figure 5A:
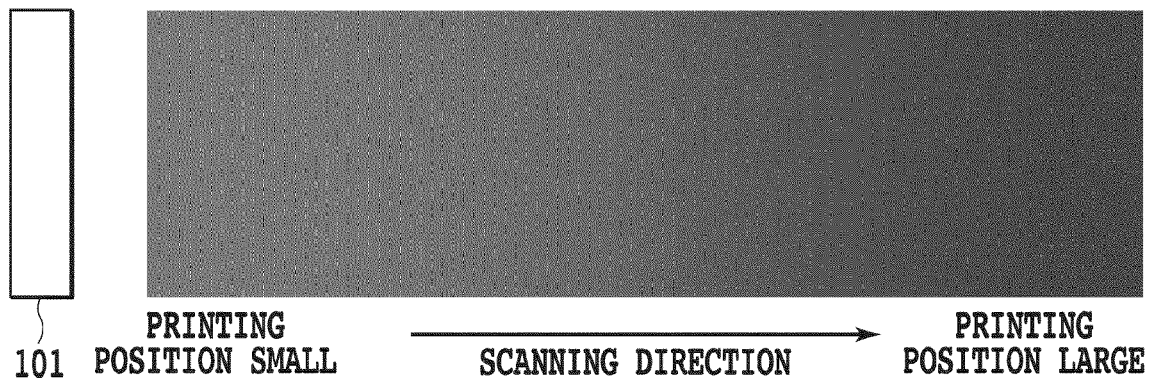
FIG. 5A is a schematic view showing a state of a printing region on which a "solid" image with the same gradation has been printed in an arbitrary main scanning in a one-pass printing mode.
Figure 5B:
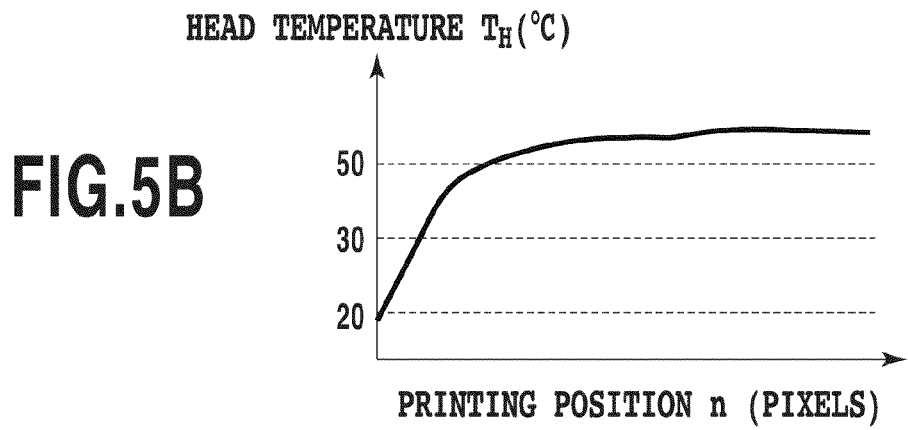
FIG. 5B is a schematic view showing the temperature of a printing head in the case where the "solid" image with the same gradation has been printed in an arbitrary main scanning in a one-pass printing mode.
Figure 5C:
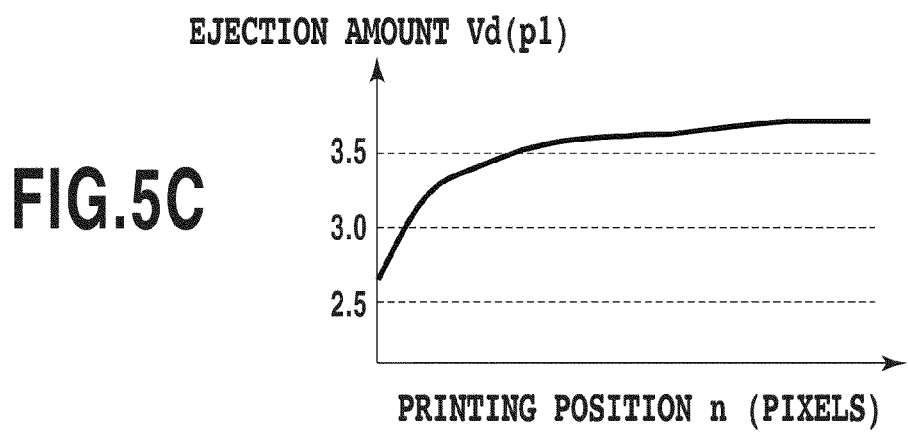
FIG. 5C is a schematic view showing an ejection amount in the case where the "solid" image with the same gradation has been printed in an arbitrary main scanning in a one-pass printing mode.
Figure 6:
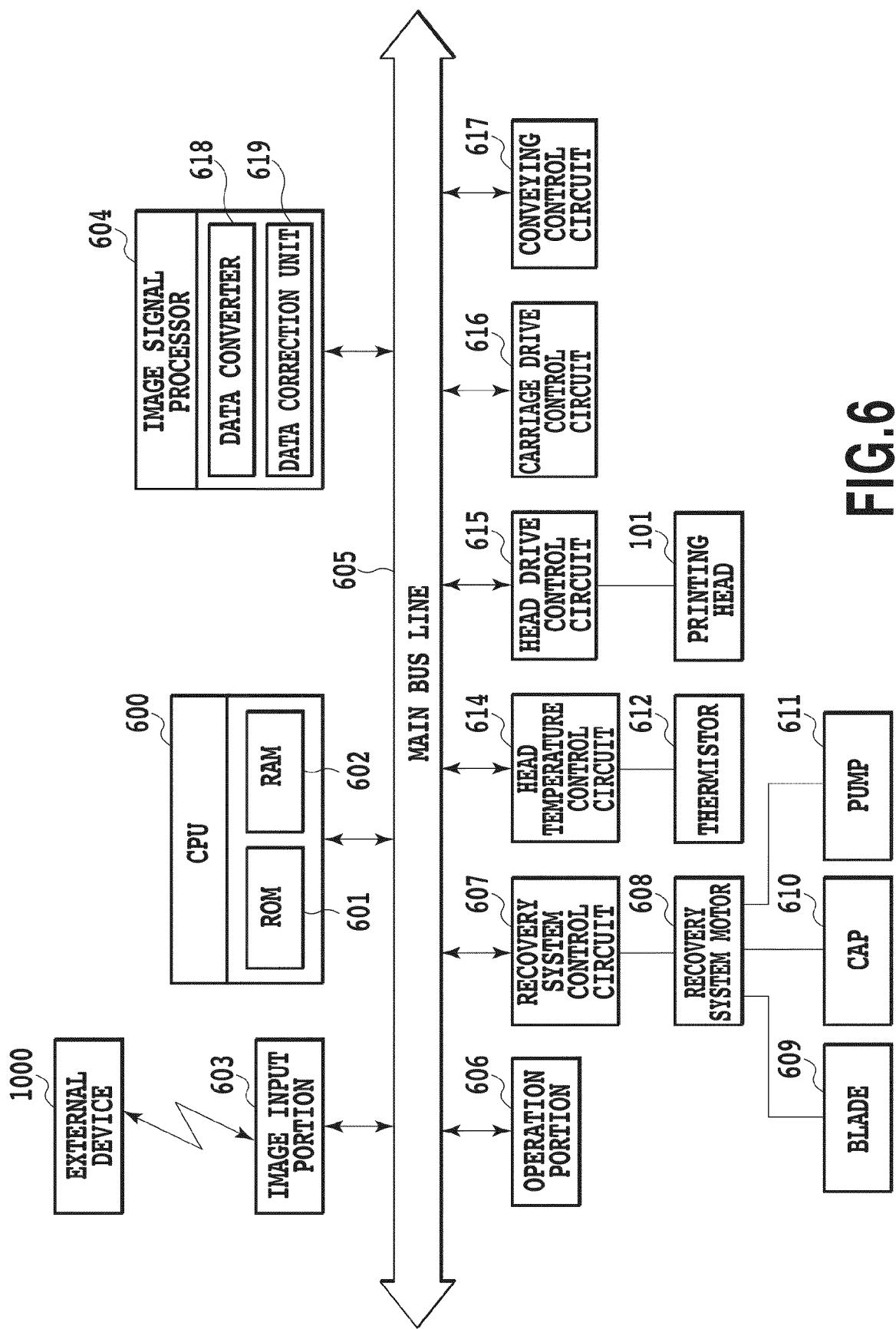
FIG. 6 is a block diagram showing an example of a configuration of a control system applicable to the inkjet printing apparatus of the present invention.

FIG. 6 is a block diagram showing an example of a configuration of a control system of a printing system applicable to the present invention. Incidentally, mechanical configurations of an inkjet printing head and an inkjet printing apparatus shown in FIGS. 1 and 2 can be employed here.

In FIG. 6, a CPU 600 performs a control on each part of the apparatus through a main bus line 605 and data processing. Specifically, in accordance with programs stored in a ROM 601, the CPU 600 performs a control on each part including a head drive control circuit 615 and a carriage drive control circuit 616 to be described later, and also performs data processing. A RAM 602 is used as a work area for the data processing performed by the CPU 600, or the like. Further, besides the above, the CPU 600 is capable of using an external storage device such as a hard disk drive not shown.

An image input unit 603 includes an interface for an external device 1000 in a suitable form, such as a personal computer or a digital camera, and temporarily holds image data inputted from the external device. The image data thus inputted include multivalued pixel data (gradation data) representing gradation. An image signal processor 609 includes a data converter 618 which performs a color conversion process, a binarization process, a mask process, or the like on inputted image data, and a data correction unit 619 for performing a data process to be described later.

An operation portion 606 includes an input unit such as a key with which an operator is allowed to perform a control input or the like, and a display unit for informing the operator of a state of the apparatus.

A recovery system control circuit 607 controls a recovery operation in accordance with a recovery process program to be timely started. A mechanism for performing the recovery operation is disposed at a home position h of FIG. 1 and includes a cleaning blade 609, a cap 610, and a suction pump 611. The cleaning blade 609 is a member which moves to clean an ejection opening formation surface of a printing head 101, while being in contact with the ejection opening formation surface. The cap 610 is a member which is movable to a position at which the cap 610 caps the ejection opening formation surface, and to a position away from this position, and protects the ejection opening formation surface by being in a capping state at the time when printing is inoperative. Further, in such a capping state, the suction pump 611 is operated to generate negative pressure inside the cap 610, so that ink is capable of being forcibly discharged through nozzles. Further, the ejection opening formation surface is caused to face the cap 610 so as to receive preliminary ejection. Each part of the forgoing recovery mechanism is capable of being operated by a recovery system motor 608.

The head drive control circuit 615 controls a drive of heaters disposed on each ejection portion of the printing head 101, and causes the printing head 101 to perform an ink ejection for printing or a preliminary ejection. The carriage drive control circuit 616 and a conveying control circuit 617 respectively control the main scanning of the carriage 206 and the conveying roller 203.

On a substrate 100, which is provided with the heaters, of the printing head 101, a warming heater (not shown) is provided, so that the temperature of ink inside the printing head 101 is heated and adjusted to a desired setting temperature. Further, a thermistor 612 is provided to the substrate 100, and an actual temperature of the ink in the printing head 101 is capable of being measured. Incidentally, the warming heater and the thermistor 612 are not necessarily provided onto the substrate 100, but may be provided outside the printing head 101 or in the vicinity thereof.

For a control system shown in FIG. 6, on multivalued pixel data included in image data inputted from the external device and retained in the image input unit 603, the data converter 618 in the image signal processor 604 forms a pattern of binary data corresponding to gradation values shown by the pixel data. For example, the data converter 618 converts each pixel data represented in 4 bits (16 gradations) into a pattern into which binary data (ejection data) determining whether to eject ink through a nozzle are developed, on a dot arrangement region corresponding to the size of the pixel.

Figure 7A:
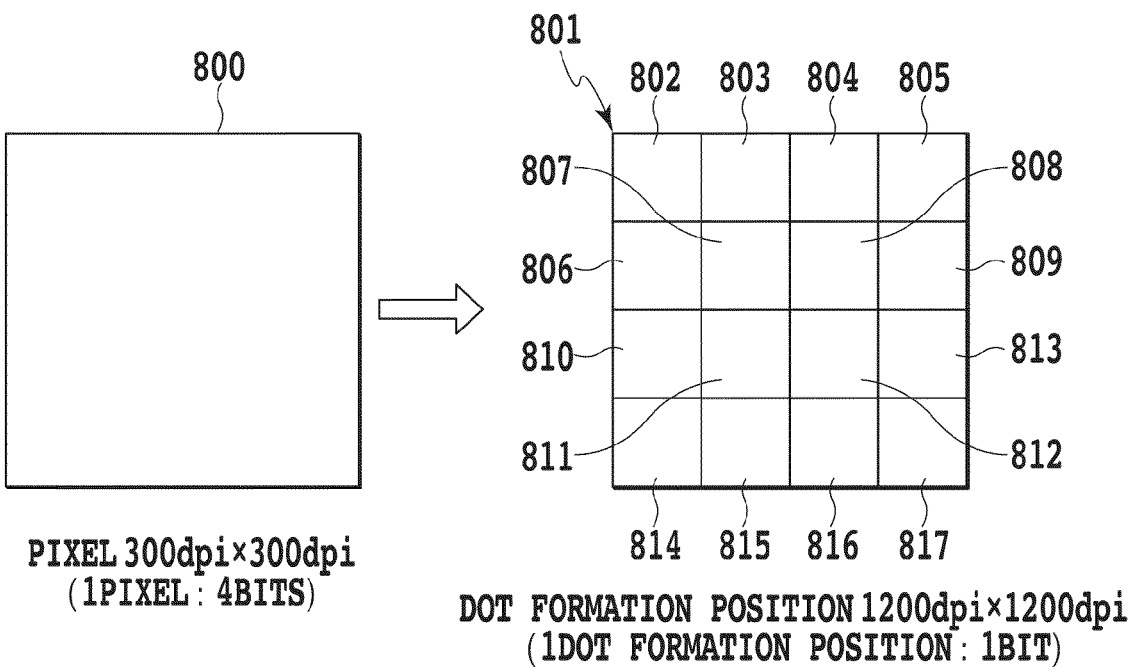
FIG. 7A is an explanatory view for explaining a process for binarizing inputted multivalued image data performed in the configuration of FIG. 6.
Figure 7B:
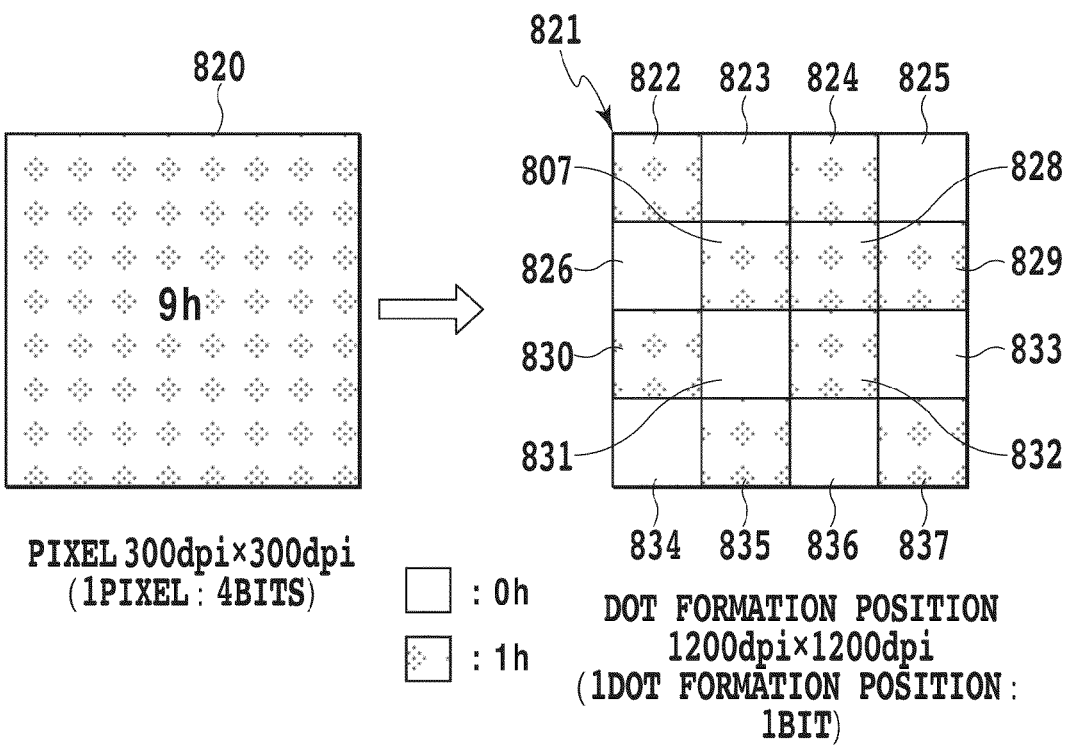
FIG. 7B is an explanatory view for explaining a process for binarizing inputted multivalued image data performed in the configuration of FIG. 6.

Referring to FIGS. 7A and 7B, described is a case of performing a binarization process on pixel data using a conversion process on the basis of an area coverage modulation. Further, in each ejection portion, nozzles are arranged on both sides of an ink supplying passage 105 at a density of 600 dpi (dots per inch), so that the ejection portion enables 1200 dpi in printing resolution.

Further, in this embodiment, as shown in FIG. 7A, pixel data 800 corresponds to a pixel having the size of 1/300 inches square (resolution: 300 dpi×300 dpi), on which data each color of C, M, Y, and K has 4 bits (16 gradations). A pseudo-halftone process and a resolution conversion process are performed for each pixel data of each of the colors. More specifically, to each pixel, a dot arrangement region 801 having 4 dot formation positions in both vertical and horizontal directions is allocated, and a grid with this 4×4 dot formation positions is defined as a unit matrix. Further, depending on gradation values of one pixel taking the values "0h" to "Fh" (h representing hexadecimal), "1" (ejection)/"0" (non-ejection) are determined on each printing dot formation position within a unit matrix, and 0 to 15 dots are arranged within the unit matrix. In other words, one dot formation position is a 1/1200 inches square (printing resolution: 1200 dpi×1200 dpi) in the main and sub scanning directions, and printing data 802 to 817 represented in each one bit (two gradations) for each color are generated.

FIG. 7B shows an example in which image data 820 transmitted from the external device and having a gradation value of "9h" are converted into printing image data 821 on which 9 dots are arranged, the data 821 including a dot arrangement region having 4×4 dots each represented in one bit. Each nozzle of each color ejection portion of the printing head 101 is driven on the basis of such printing data.

Incidentally, various methods for a pseudo-halftone process and a resolution conversion process have been proposed. In this embodiment, 4-bit data for one input pixel are converted into data of the 4×4 dot arrangement region with dots with reference to a table on which the number of dots and a dot arrangement manner have been determined in advance depending on values to be taken for the 4-bit data, and thereby a pseudo-halftone process and a resolution conversion process are performed at the same time.

Further, the resolution conversion process using an area coverage modulation method has been exemplified as a binarization process of input image data, but an arbitrary processing method such as an average density conservation method or a dither matrix method is also adoptable.

2. Embodiment of Control

Next, an embodiment of a control to be performed by an inkjet printing apparatus having the above-described configuration is specifically described.

AS described above, as a factor determining an ejection amount of an inkjet printing head, there is a temperature of ink in an ejection portion (which may be replaced by the temperature of a printing head).

Figure 8:
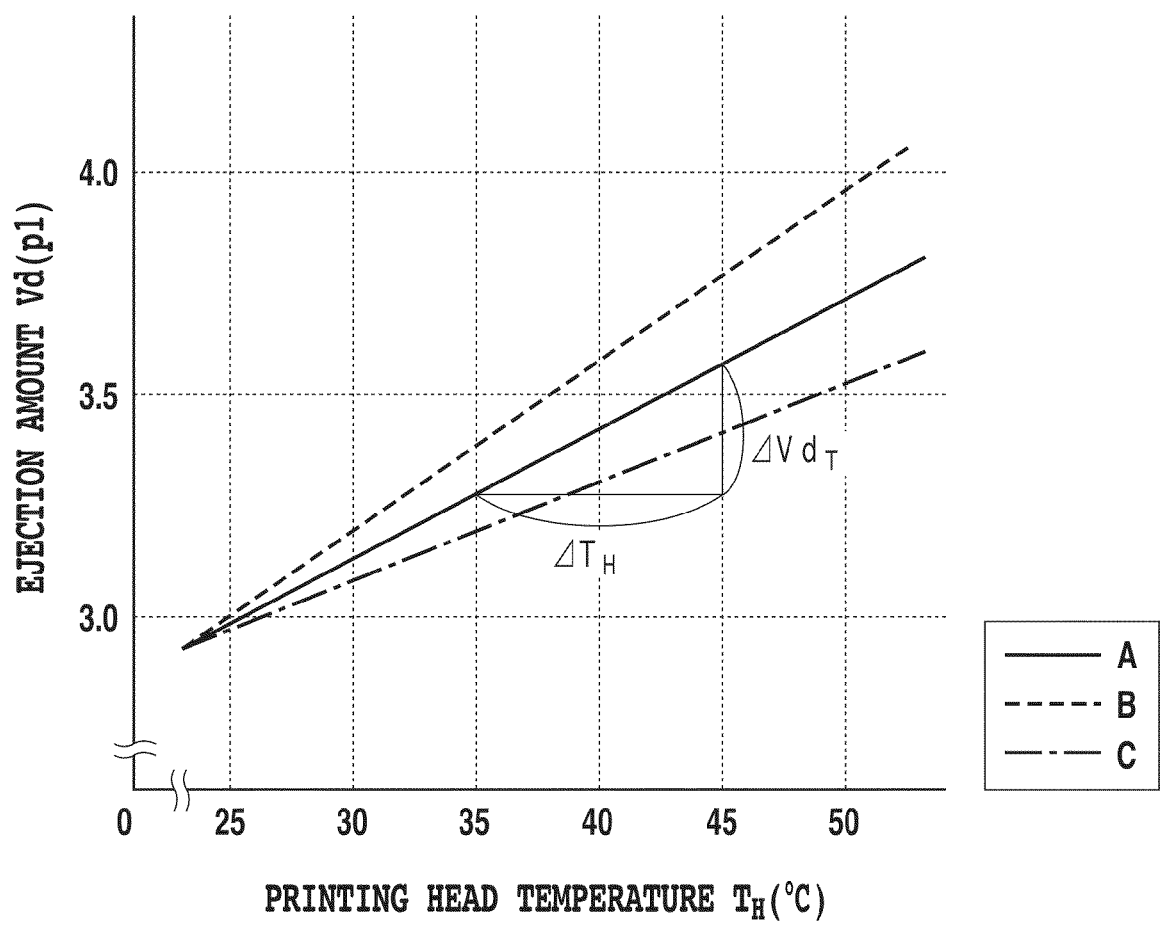
FIG. 8 is a schematic view showing a temperature dependent property of an ejection amount in the case where a drive condition is fixed at the time when a pulse signal is applied to a heater to be thereby driven.

FIG. 8 is a schematic view showing a temperature dependence property of an ejection amount in the case where a drive condition is fixed at the time when a pulse signal is applied to a heater to be thereby driven. As shown in a curve A of the drawing, an ejection amount Vd increases linearly with an increase of a printing head temperature TH (in this case, this temperature is equal to that of ink in an ejection portion since a static temperature property is concerned). When the slope of this straight line is deified as a temperature dependent coefficient, the temperature dependent coefficient is expressed by, $$KT = \Delta Vd T / \Delta TH (pl/^\circ C. \cdot dot).$$

This coefficient KT is determined on the basis of physical properties of ink, or the like irrespective of a drive condition, so that in some cases, a temperature dependency represented by a curve B or C is presented.

In this invention, variation in an ejection amount due to the above-described the variation of the ink temperature is reduced using an image correction by which the total number of dots of print data is changed so that a print density on a printing medium may be held constant. Here, a process for acquiring an amount of correction for the reduction of the variation of the ejection amount is basically performed on the basis of image data. In each embodiment below, a count process is performed in acquiring the amount of correction. For such count processes, there is one which is performed on the basis of multivalued image data (pixel data) representing a gradation for each pixel, and another which is performed on the basis of data after being converted into binary form. The former is described as a first embodiment, and the latter is described as a second embodiment.

In the following description, 256 nozzles are assumed to be provided to an ejection portion having the foregoing printing resolution. Further, in either one of these embodiments, it is assumed that one-pass printing is performed by which an image is completed on one printing region by one-time main scanning, along with which bidirectional printing is performed. However, in the case where multipass printing is performed, or also in the case where one-directional printing is performed, the above is applicable.

2.1 First Embodiment

Figure 9:
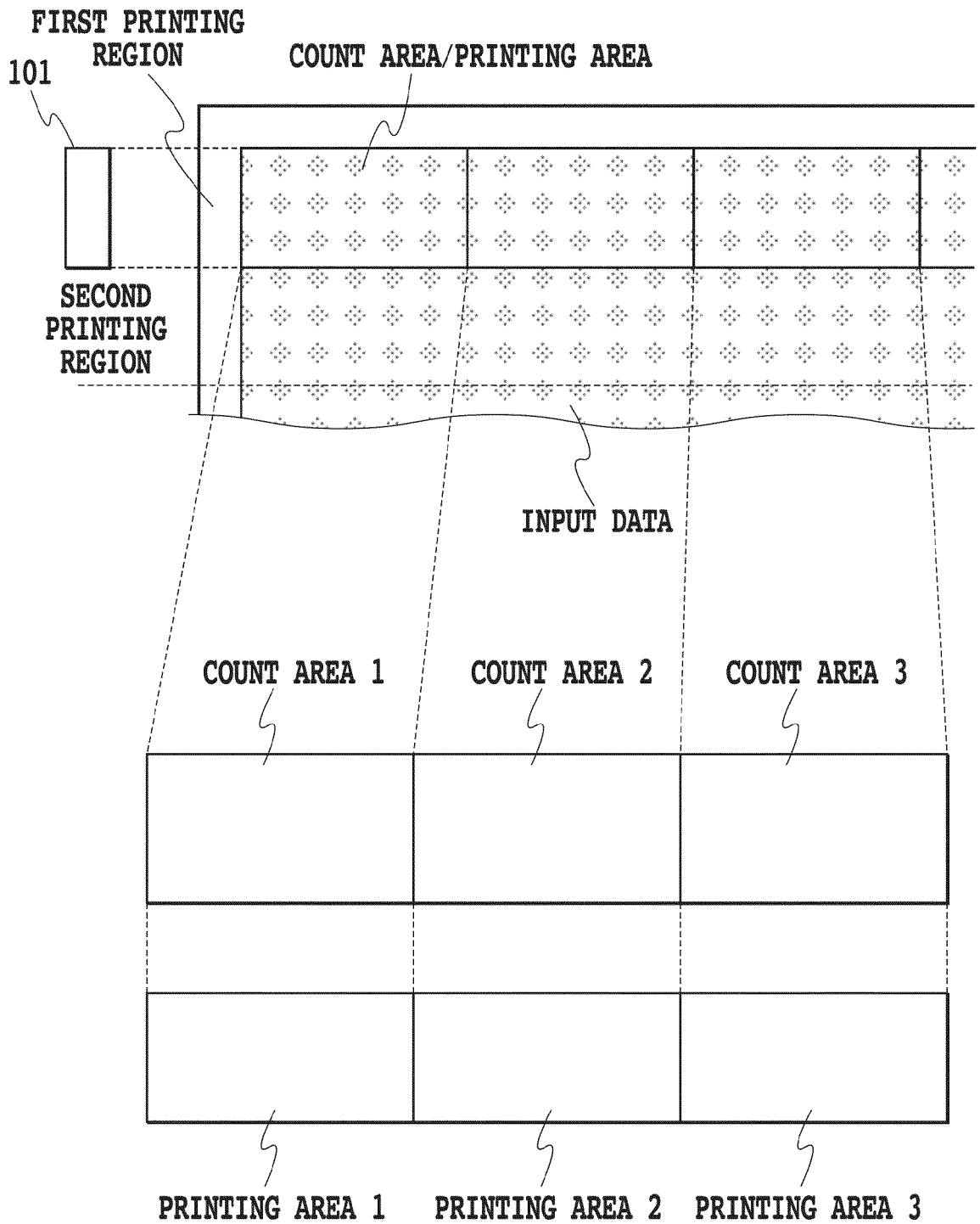
FIG. 9 is a schematic view for explaining concepts of count areas, the number of printed dots on each of which is counted, and of printing areas, the number of dots of print data on each of which is changed, the count areas and printing areas being used in a first embodiment of the present invention.

FIG. 9 is a schematic view for explaining concepts of count areas, gradation values on each of which represented by pixel data are counted, and of printing areas, the number of printed dots on each of which is changed. In FIG. 9, for the sake of simplicity of description, printing areas are each assumed to have the same size as count areas.

Figure 10:
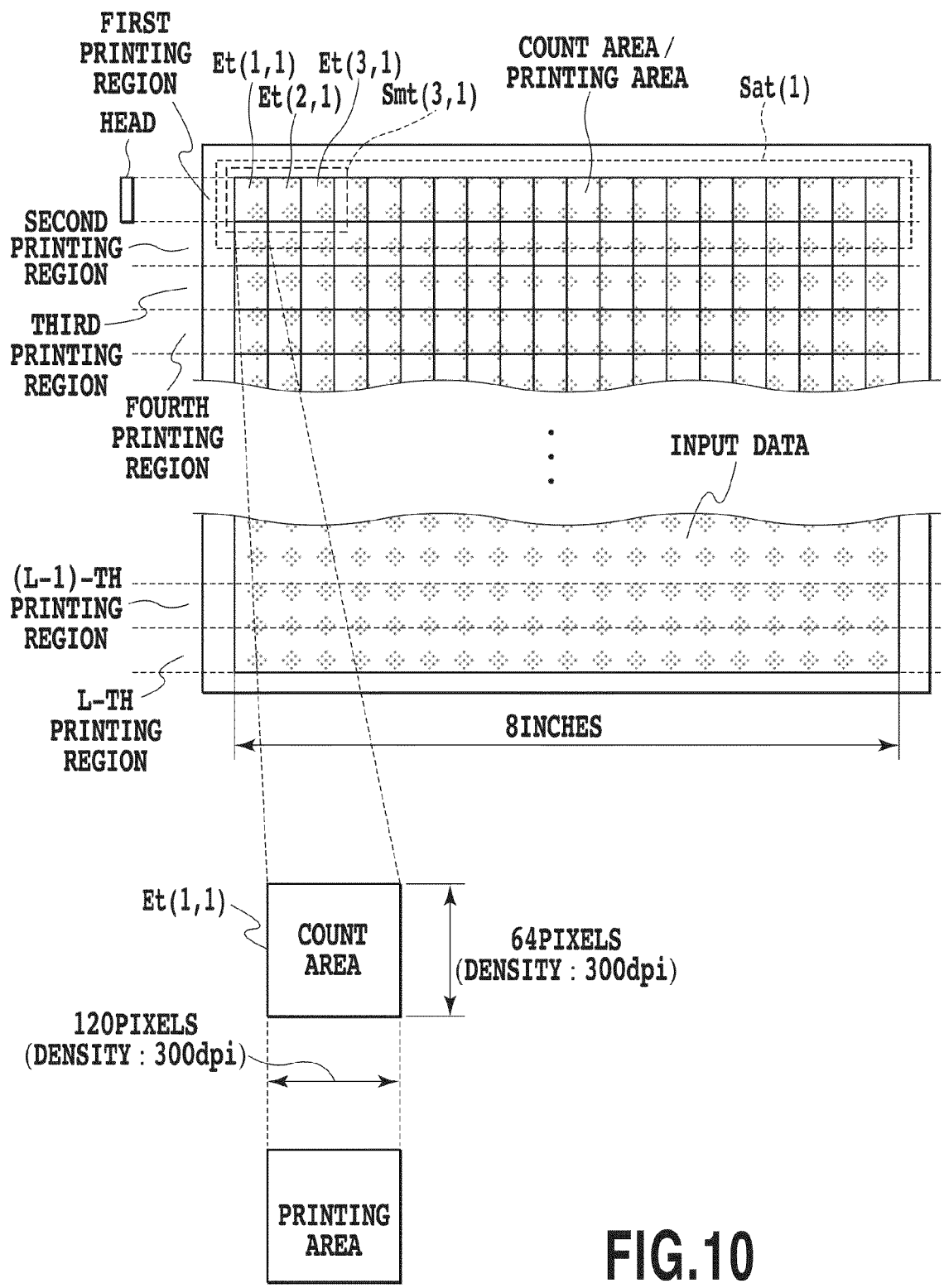
FIG. 10 is a schematic view for explaining division states of the count areas, the number of printed dots on each of which is counted, and of the printing areas, the number of dots of print data on each of which is changed, the count areas and printing areas being used in the first embodiment of the present invention.

As shown in FIG. 10, in this embodiment, for example, in the case where printing is performed on the whole printing area which is equivalent to one page of printing media in l=L, times of main scanning, inputted image data corresponding to print data for a single main scanning of an ejection portion are divided in a first scanning as follows. Specifically, input image data corresponding to data for (Number of nozzles)× (Number of dots on one line in the main scanning direction) are divided into N pieces (N=1 in FIG. 10) of count areas and printing areas in the longitudinal direction (nozzle arrangement direction), and M pieces thereof in the lateral direction (main scanning direction). Each count area and each printing area have the same number of pixels.

To be more precise, one pixel is 1/300 inches square and pixels in the longitudinal direction (corresponding to a nozzle arrangement direction) is divided into groups each having 64 pixels (=256/4), with N=1, and a print width (8 inches, for example) in the lateral direction (corresponding to a main scanning) is divided into M=20 pieces of count areas. The print width corresponds to 2400 pixels (=8×300), and each count area and each printing area each correspond to a length of 64 pixels and a width of 120 pixels. As described above, in each pixel data within a count area and a printing area, one of the gradation values "0 (=0h)" to "15 (=Fh)" is described, which represents the number of dots arranged in a dot arrangement region, i.e., the number of times of droplet ejection in that region.

Further, a count result in each count area is denoted by $Et(m, n)$, which is a count value of a count area located at the m-th position in the lateral direction and at the n-th position in the longitudinal direction. The count value of the count area is obtained by adding multivalued data of respective pixels within the count area. In addition, an added-up count value $Sm(m, n)$ denotes an added-up value of gradation values of count areas, arranged in the lateral direction, from a laterally first and longitudinally n-th position to a laterally m-th and longitudinally n-th position. Still further, a total count value $Sat(l-1)$ represents an added-up value of gradation values acquired as a result of printing performed from a printing start up to the last scanning, and $Ht(m, n)$ represents an amount of correction calculated for each printing area.

More specifically, as shown in FIG. 10, a value represented by $Sm(3, 1)$ is a sum acquired by adding $Et(1, 1)$ to $Et(3, 1)$ which are count values of gradation values within count areas located from a longitudinally first and laterally first position to a longitudinally first and laterally third position. Further, $Sat(1)$ has the same value as $Smt(20, 1)$ which is an added-up value of all the count areas in the lateral direction in a first main scanning, and $H(1, 1)$ represents an amount (number of dots) of correction for print data on a printing area located at a longitudinally first and laterally first position.

Figure 11:
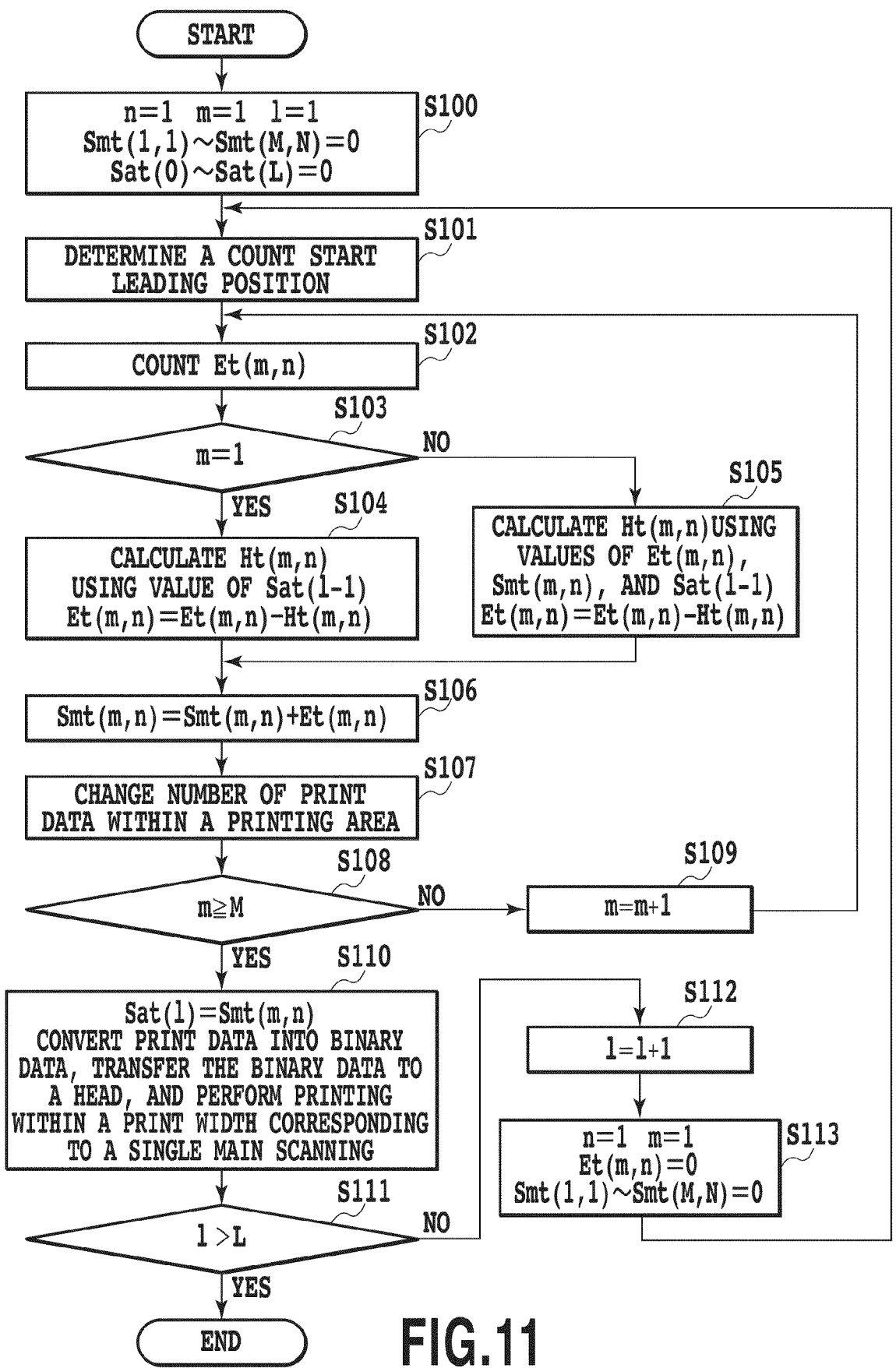
FIG. 11 is a flowchart showing, a processing procedure, of the first embodiment of the present invention, for counting the number of dots (gradation value) of pixel data, and for correcting the gradation value on the basis of the count result, to be performed for each main scanning.

FIG. 11 is a flowchart showing a processing procedure, of this embodiment, for counting gradation values of pixel data, and for correcting gradation values on the basis of the count result, to be performed for each main scanning This procedure is started for each main scanning. First, in Step S100, a target count area $Et(m, n)$ to be processed is defined by setting m=1, n=1, and l=1. Further, a memory area such as a resistor is initialized, in which values of $Smt(1, 1)$ to $Smt(M, N)$, and those of $Sat(0)$ to $Sat(L-1)$ are stored.

In Step S101, a count start leading position of a count area is caused to be the same as a leading position of input data corresponding to first print data.

In Step S102, gradation values within the target count area specified by the values m=1 and n=1 among all count areas at the laterally first position are added, and a count value of the count area is set as $Et(1, 1)$ and temporarily stored in the memory area.

In Step S103, it is determined whether the target count area is at the first position in the lateral direction, i.e., whether the count area is at a leading position in the main scanning direction. If the determination is affirmative, the process moves to Step S104; otherwise, the process moves to Step S105.

In Step S104, a prediction value of an increase of density due to an increase in an ejection amount is calculated on the basis of a count data of the total count value $Sat(l-1)$ from a printing start up to the last scanning for printing. The printing main scanning is a first one, i.e., l=1, which means there is no previous ejection at this time, so that $Sat(0)=0$. Then, a calculation is made as to the amount of correction $Ht(1, 1)$ for print data on an area specified by the values of m=1, n=1 representing a printing area at the first position in the lateral direction. The amount of correction $Ht(1, 1)$ thus calculated is subtracted from $Et(1, 1)$ having the same value as a count value of this printing area, so that a newly obtained count value after the above subtraction is set to a new $Et(1, 1)$.

In Step S106, $Et(1, 1)$ obtained above is added to a value of the added-up count value $Smt(m, n)$ in the lateral direction, and the value obtained after the above addition is stored in a corresponding memory area as a new value of $Smt(m, n)$.

In Step S107, a correction corresponding to the amount of correction $Ht(1, 1)$ is performed on print data in the laterally first printing area, whereby numeric values of the print data in the printing area are changed. In this embodiment, a change of print data is performed in such a way that, pixel gradation values in the printing area are changed on the basis of an order of numeric values of a threshold matrix mask by numerical values corresponding to the amount of correction.

Further, in Step S108, it is determined whether $m \geq M$ (=20). If m<M, the value of m is incremented by +1 in Step S109 and, thereafter, the count area is shifted by one in the main scanning direction. Thereafter, processes in Steps S102 to S109 are repeated, so that a correction is performed on print data in a printing area.

Specifically, for m=2 (<20), in Step S102, a count value of a laterally second target count area is first set as $Et(2, 1)$ and temporarily stored in a memory area.

In Step S103, since the target count area is the laterally second one, the process moves to Step S105.

In Step S105, a prediction value of an increase of density due to an increase of an ejection amount is calculated on the basis of three types of count data, i.e., $Et(1, 1)$, $Smt(1, 1)$, and a total count value $Sat(0)$ (=0) for ejections performed from a printing start to the last main scanning. Then, the amount of correction $Ht(2, 1)$ of print data on an area is calculated, the area representing a laterally second printing area and specified by the values of m=2, n=1. Further, a count value obtained by subtracting the calculated amount of correction $Ht(2, 1)$ from $Et(2, 1)$ having the same value as a count value within the above printing area is set as a new $Et(2, 1)$.

In Subsequent Step S106, $Et(2, 1)$ obtained above is added to the last added-up count value $Smt(1, 1)$ in the lateral direction, whereby a newly obtained added-up count value $Smt(2, 1)$ in the lateral direction is stored in a corresponding memory area.

In Step S107, a correction corresponding to the amount of correction $Ht(2, 1)$ is performed on print data in the laterally second printing area, whereby the numeric values of the print data in the printing area are changed.

Further, in Step S108, it is determined whether $m \geq M$ (=20). If m<M, the value of m is incremented by +1 in Step S109 and, thereafter, the count area is shifted by one in printing main scanning direction. Subsequently, the processes in Steps S102 to S109 are repeated, so that a correction is performed on print data in a printing area. Thereafter, the processes in Steps S102 to S109 are repeatedly performed for all values of m (1 to M), whereby a correction is performed on print data in a corresponding printing area.

In Step S108, when it is determined that $m \geq M$, the process moves to Step S110. Here, a value (being equal to $Smt(20, 1)$ at this time) of the added-up count value $Smt(m, n)$ in the lateral direction is set as a new total count value $Sat(1)$ (l=1 at this time), and stored in a memory area. Along with this, a resolution conversion process converting the corrected image data into print data in the above-described manner is performed, and the print data thus converted are transferred to a printing head, so that printing is performed across a printing width for a single main scanning. At the same time of this printing operation, a correction process is performed on print data for the following main scanning.

In Step S111, it is determined whether l>L, and if l<L, the value of l is incremented by +1 in Step S112, and thereafter, a count area is longitudinally shifted by one.

In Step S113, among values obtained by counting in the last main scanning, the memory which stores temporarily a count value Et(m, n) in a target area and an added-up count value Smt(m, n) in the lateral direction is initialized to 0. Thereafter, the processes in Steps S101 to S113 are repeatedly performed, whereby ink is ejected through the printing head on the basis of the corrected print data to thereby complete an image, while the counting and the correction process on print data are sequentially performed.

Next, a correction method for print data used in this embodiment is described in detail.

In this embodiment, for the correction method for print data, a method in which levels of gradation values of multivalued pixel data are changed is adopted.

FIG. 12 is a schematic view showing multivalued pixel data corresponding to an arbitrary region of print data. At this stage, the total number of dots of print data and an added-up value of gradation values of input image data are identical with each other.

In Steps S104 and S105, a value being reduced, as an amount of correction, from an added-up value of gradation values of input image data is calculated. Further, a process for reducing a gradation value of an arbitrary pixel of input image data by one level is performed, and this process is repeated until a total of reduced values attains a value corresponding to an amount of correction. At this time, in this embodiment, a method has been adopted in which a threshold matrix mask having the same size as a count area is prepared to select pixels being targets from which gradation values are reduced.

FIG. 13 shows an example of a threshold matrix representing a matrix mask on which 7680 (=64×120) numeric values ranging from "0" to "7679" are provided to respective pixels within a mask size (64×120 pixels). Allocating order of numeric values for pixels is made so that dispersiveness of the disposition positions of all numeric values can be high.

Next, a process is performed in which, in accordance with an order of numeric values of this threshold matrix, a gradation value of a corresponding pixel on input image data is reduced by one level. Until a total number of reduced gradation values attains a calculated correction value, gradation values of pixels included in the input image data are reduced by one level in accordance with the order of the threshold matrix.

FIG. 14 is a schematic view for explaining this process in detail. Let us assume that an added-up count value of input image data 1401 corresponding to a certain count area is "3000." Let us, further, assume that a value to be used for reduction as an amount of correction is "300." In this case, a process is performed in which, among 7680 pixels in total on the input image data 1401, gradation values of pixels corresponding to pixel positions "0" to "299" of the threshold matrix 1301 are each reduced by one. Data thus changed are as shown in numeral 1402. In data 1402, shaded portions represent pixels with changed data. Incidentally, suppose a case where, since some gradation values of pixels are "0" from the beginning, and thereby can not be reduced, the amount of correction does not attain "300." In such a case, the process may be performed on pixels of the input image data 1401 corresponding to pixel position "300" or later of the threshold matrix 1301.

As described above, in this embodiment, print data in the main scanning direction are divided into multiple areas, and for each input image data corresponding to each of these areas, gradation values (corresponding to the number of times of droplet ejection, i.e., the number of ejecting dots) shown by pixel data included in this input image data are counted. Further, on the basis of this count value, the number of dots to be ejected on a printing area is changed to perform printing, so that it is possible to reduce density unevenness due to an increase in an ejection amount occurring in the main scanning direction.

In this embodiment, the case has been described where the number of count areas in the longitudinal direction is one, the number of count areas in the lateral direction is twenty, and all have the same sizes. However, it is possible to suitably set or change the numbers of count areas and the size thereof in accordance with temperature increase characteristics of a printing head, and sizes of droplets.

Figure 15:
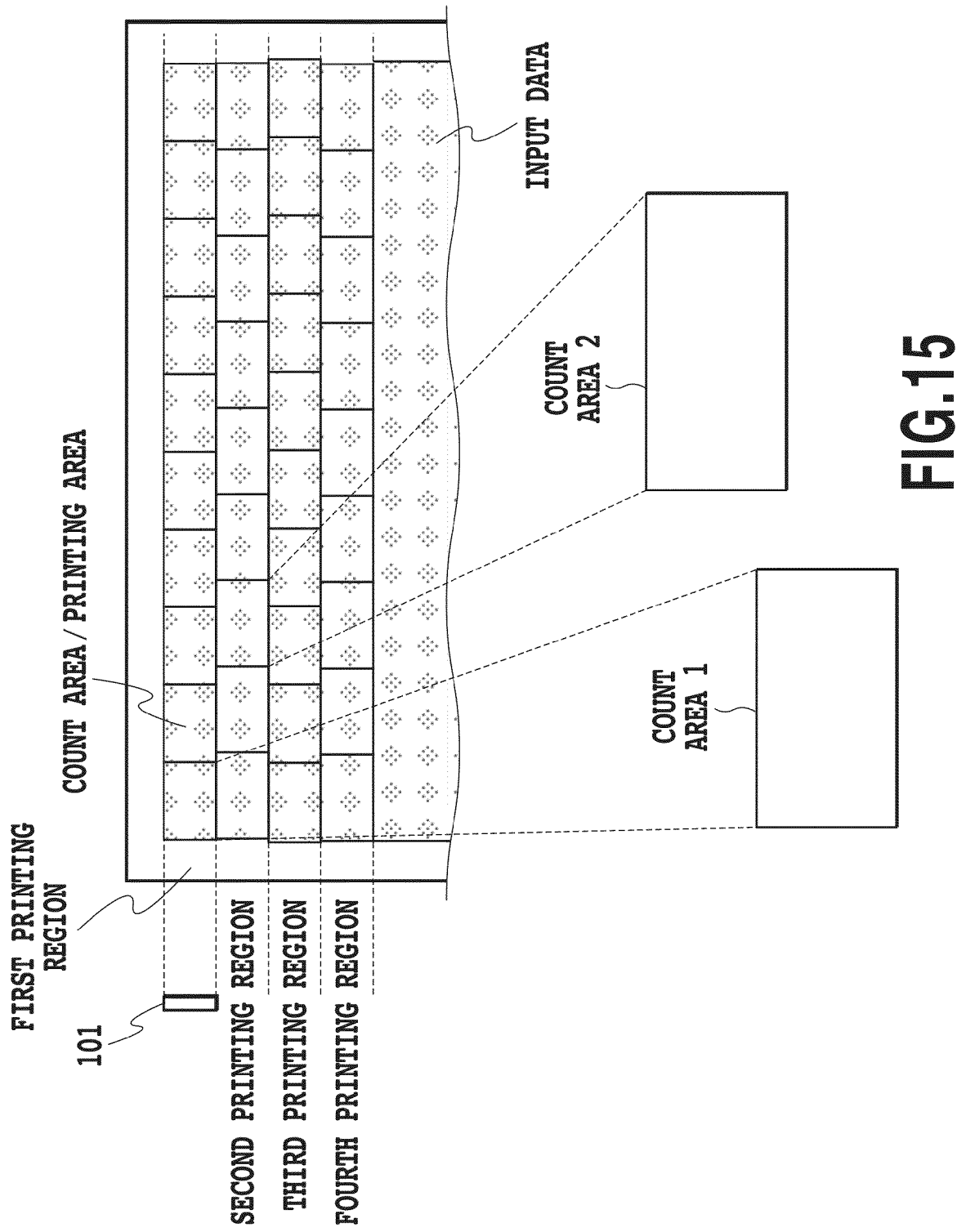
FIG. 15 is an explanatory view showing an example according to a modification of the first embodiment of the present invention in which the number of divisions for and sizes of count areas are caused to be different for each main scanning.
Figure 16:
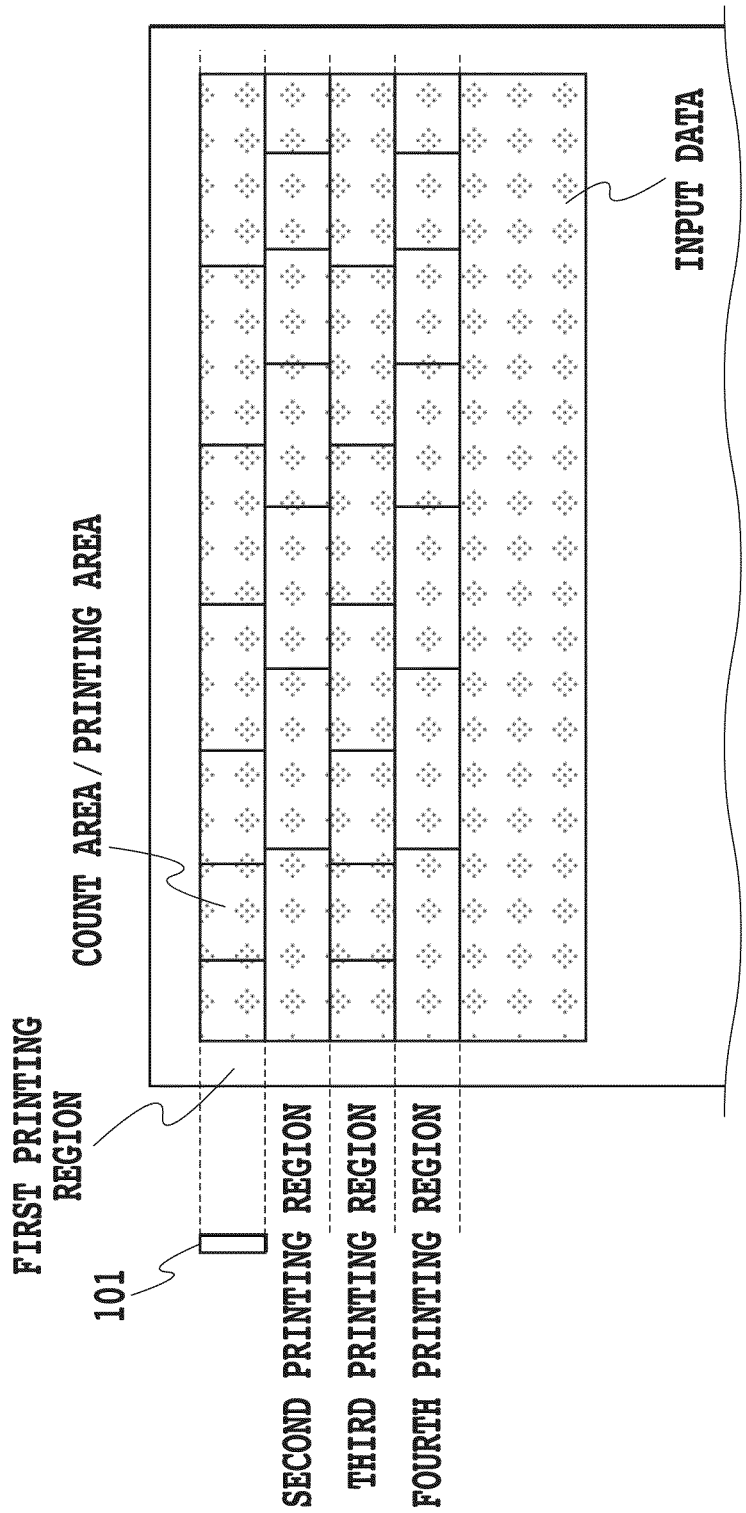
FIG. 16 is an explanatory view for showing an example according to another modification of the first embodiment of the present invention in which sizes of count areas are caused to be different within a single main scanning.
Figure 17:
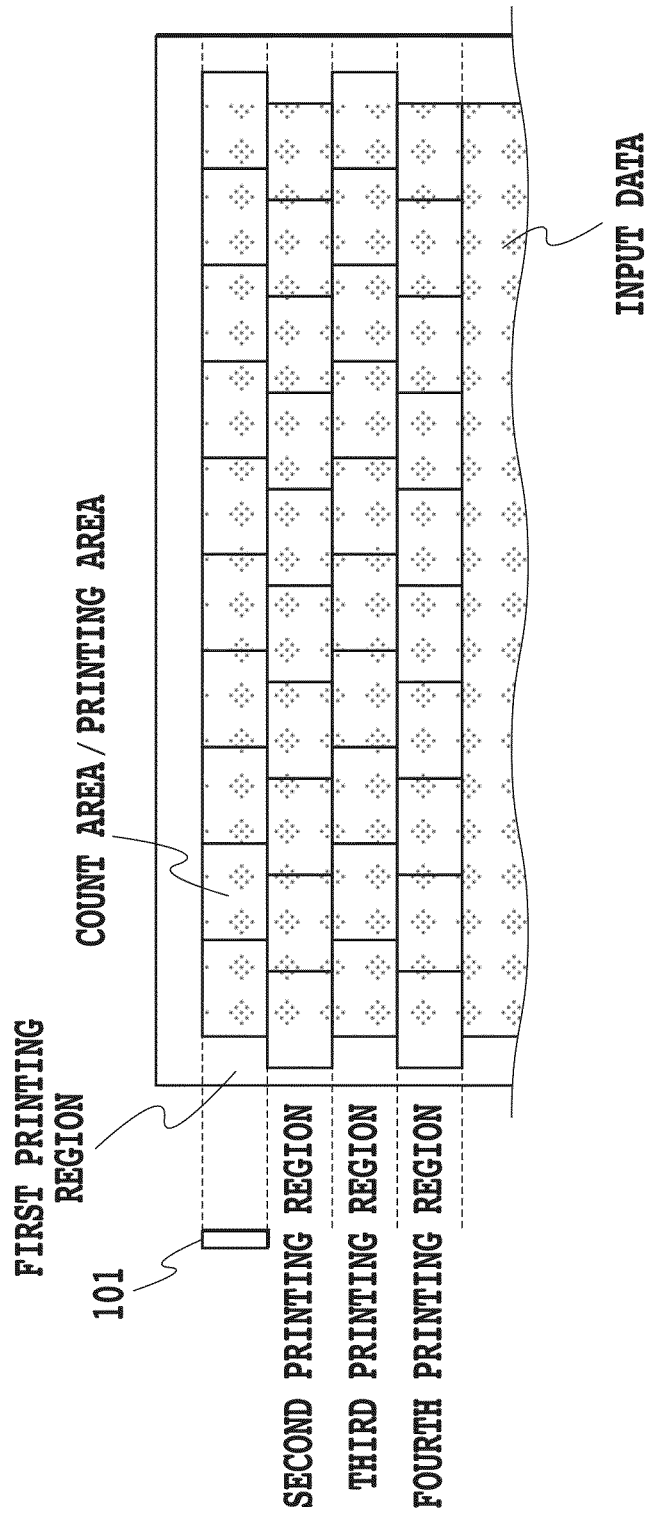
FIG. 17 is an explanatory view showing an example according to still another modification of the first embodiment of the present invention in which count areas and printing areas are set so that boundary positions of the count areas and the printing areas may be shifted for each main scanning.

For example, as shown in FIG. 15, the number of count areas, and sizes thereof in the lateral direction (the main scanning direction) may be changed for each main scanning; or as shown in FIG. 16, sizes of count areas may be changed within a single main scanning. Further, as shown in FIG. 17, even if the sizes of count areas are the same as each other, it is still possible to set a sum of the sizes of the count areas in the main scanning direction to be larger than the size of a maximum image, which is hatched, and to set boundary positions of the count areas to be shifted for each main scanning.

Figure 18:
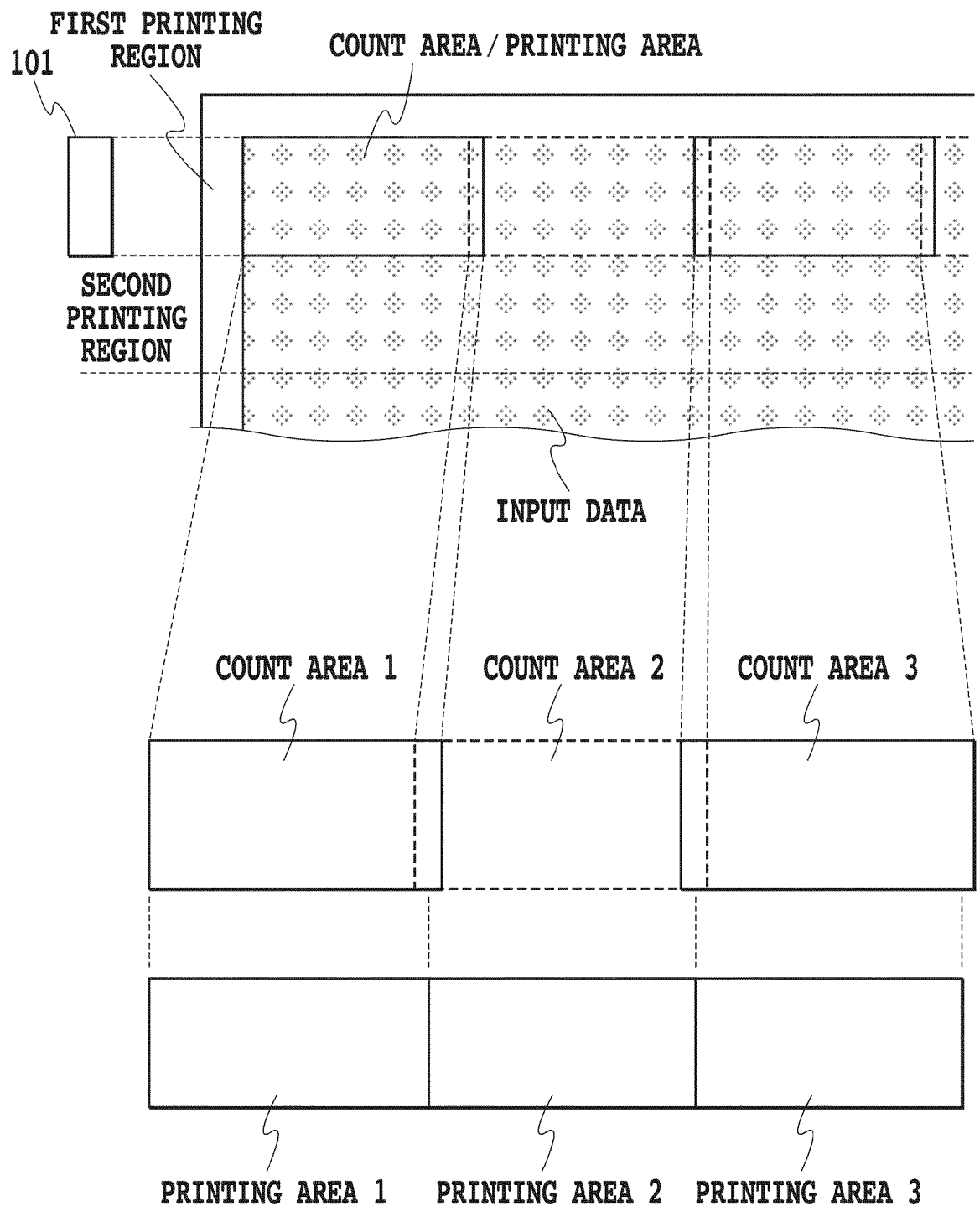
FIG. 18 is an explanatory view for schematically explaining division states of count areas, and printing areas, the number of dots of print data on each of which is changed, in a case according to a further modification of the first embodiment of the present invention in which count areas and printing areas are set so that sizes of the count areas and printing areas may be different.

Further, in the first embodiment, the description has been made of the case where sizes of count areas are the same as those of printing areas corresponding thereto. However, the sizes of count areas may be different from those of printing areas, so that, for example, neighboring count areas may overlap on ends thereof as shown in FIG. 18. In this case, when a correction of image data within a printing area is performed on the basis of data obtained as a result of counting on count areas, a correction process is performed with one of the areas overlapped, so that a correction effect on boundary positions can be improved.

Figure 19:
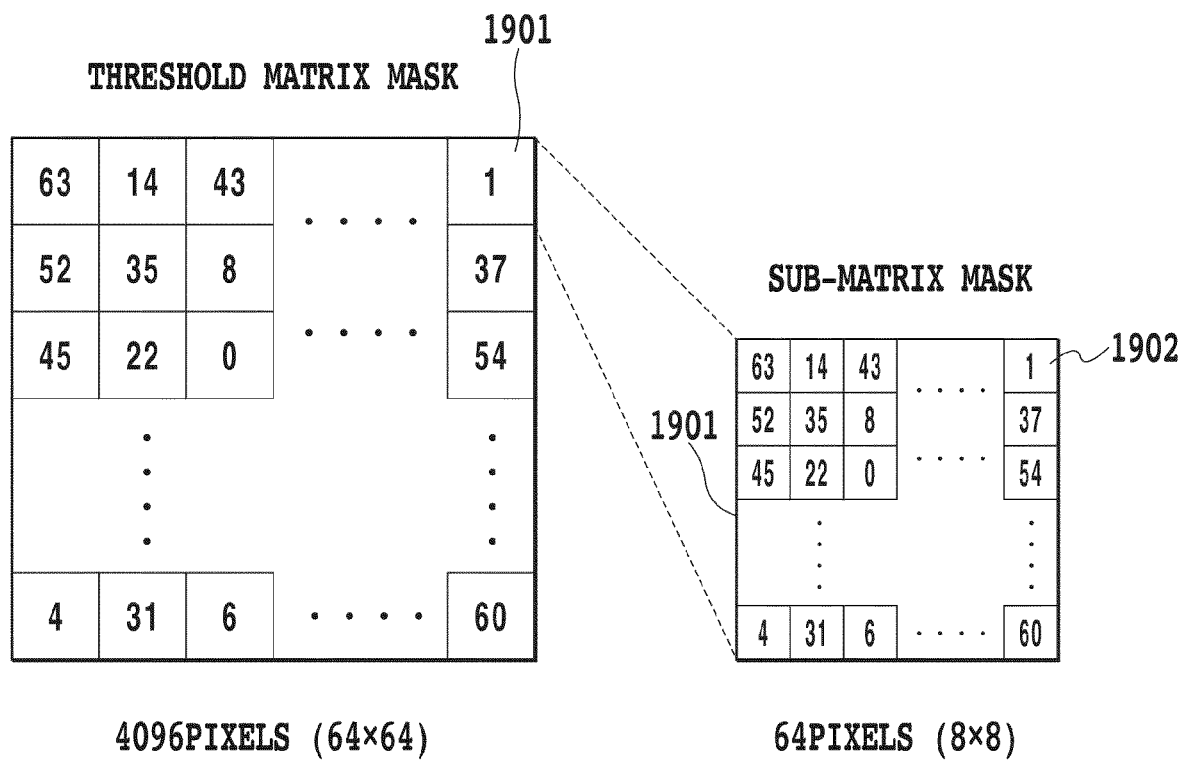
FIG. 19 is an explanatory view showing another example of a threshold matrix mask to be used for correcting print data in the first embodiment of the present invention.

Further, for the correction method on image data, a technique for changing gradation values of multivalued input data is not limited to the above. For example, as shown in FIG. 19, as in the first embodiment, although the size of a mask is set to have 61×64 pixels which are the same as that of a count area, a threshold matrix may include, for example, a set of unit matrices 1901 with 8×8 pixels. In addition, a mask with a so-called sub-matrix structure may be used in which numeric values "0" to "63" are given to matrix positions of each unit matrix 1901 within a mask, and similarly, numeric values "0" to "63" is also given to pixels 1902 within each unit matrix. In this case, a change method of gradation values of input data is to perform a process in which, in accordance with an order of numbers of unit matrices and with an order of numbers within the unit matrices, gradation values of input data at corresponding positions are reduced for an amount of correction. This process is performed in sequence until the value attains those corresponding to the amount of correction. Use of such sub-matrices enables a configuration of a threshold matrix using small masks, so that this method is effective when an emphasis is placed on apparatus cost.

For the allocation of numbers of the threshold matrix, in the first embodiment, the numbers are allocated so that the dispersiveness of all the allocating positions of arbitrary numbers is high. However, as shown in FIG. 20, numbers may be allocated in such a way that smaller numbers are put on a starting side of the main scanning direction, and that numbers become larger toward a terminal end of the main scanning direction. This technique is effective for reducing a sharp change of density on boundary positions of count areas, especially for a head with a characteristic that a temperature increase tendency is quite high.

Alternatively, for the technique for changing multivalued data, it is also possible to reduce gradation values within an area preferentially from ones with high values.

In any cases, performing the correction process on multivalued data is effective, because the effect on photograph-like image printing for which a high image quality is desired is very high.

In addition, in the first embodiment, the amounts of correction are calculated on the basis of three types of count results for gradation values represented by pixel data, i.e., the count number within a target count area, the added-up count number in the lateral direction, and a total count number of ejections from a printing start up to printing in the last main scanning. Here, it is desirable that for the calculation method of the amount of correction, an optimal one be selected in view of calculation accuracy and apparatus cost. For example, instead of the counting of a total count number of dots from a printing start up to printing in the last main scanning, there is another applicable method in which a temperature of a printing head is acquired at an arbitrary timing immediately before starting the following main scanning, and information on the acquired temperature is converted whereby an amount of correction is calculated.

Further, the timing of the correction also is not limited to the timing in the first embodiment, where the correction is performed on all print data corresponding to a single main scanning, and then the printing operation is started. For example, it is possible to employ a method in which data corresponding to multiple times of scanning are always processed in advance, or to perform printing in real time by transferring, to a printing head, print data at the same time of completing the correction of the print data. An optimal method can be adopted in accordance with conditions such as a printing speed at the time of printing, the sizes of count areas, and the number of nozzles.

In addition, in the first embodiment, the case has been described where, as a printing mode, a one-pass printing mode is adopted, but the present invention can be applied to a case where a multipass printing mode is adopted. In this case, it is desirable that an amount of correction of print data in each pass be calculated, with a condition such as a reduction in the number of printed dots per main scanning taken into consideration. Further, the amount of correction may be calculated, with the length of intervals between main scannings taken into consideration.

Still further, when continuous printing on multiple pages is performed, an amount of correction for a main scanning on the top of a page can be determined, with a printing state in the last page, and a length of intervals between pages taken into consideration.

Those described above are applicable to a second embodiment below.

3. Second Embodiment

A second embodiment of the present invention is described below. Incidentally, in this second embodiment, a basic configuration of a printing apparatus, a printing head, and a control system, and a printing mode are the same as those of the first embodiment. Further, in this embodiment, also, a relationship between temperature of a printing head and an ejection amount is as shown in the curve B of FIG. 8, and further, the printing head used in this embodiment has a characteristic that an increase in ejection amount is large with an increase in the temperature of a head compared with the increase in ejection amount in the first embodiment.

In this embodiment, as in the first embodiment, the method is used in which a total number of dots of image data, the data printing changes in the ejection amount, is changed, and also for the correction method of image data, the method in which multivalued data are changed is used. However, unlike the first embodiment, for the count process for performing their correction, a method in which data (ejection data) after being converted into binary data are counted is used.

In the control system shown in FIG. 6, for multivalued pixel data included in image data inputted through the external device and held in the image input unit 603, the data converter 618 in the image signal processor 604 makes a binary pattern corresponding to gradation values shown in the pixel data. Further, the input image data are held in the RAM 602.

Figure 21:
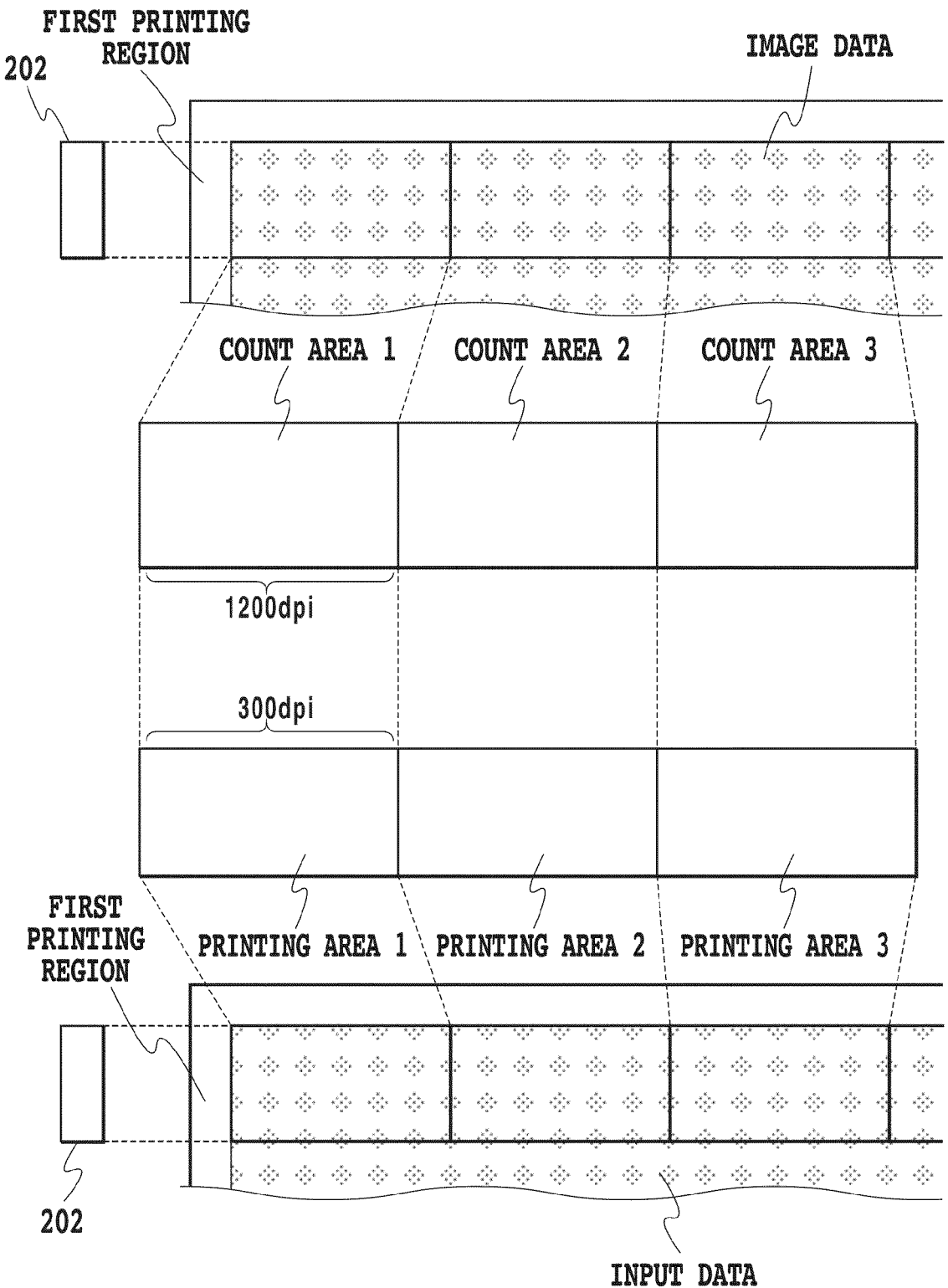
FIG. 21 is a schematic view for explaining division states of count areas, the number of printed dots on each of which is counted, and of printing areas, the number of dots in print data on each of which is changed, the count areas and printing areas being used in a second embodiment of the present invention.

FIG. 21 is a schematic view for explaining concepts of count areas on each of which the number of printed dots is counted, and of printing areas on each of which the number of printed dots is changed, the count areas and printing areas being used in this embodiment. An upper half of the drawing is to explain the count areas, and a lower half thereof is to explain the printing area. Respective halves are schematic explanatory views. In FIG. 21, for the sake of simplicity of explanation, the sizes of dot count areas and printing areas are set so that the total number of added-up valid dots within a printing area is the same as the total number of valid dots within a dot count area.

Figure 22:
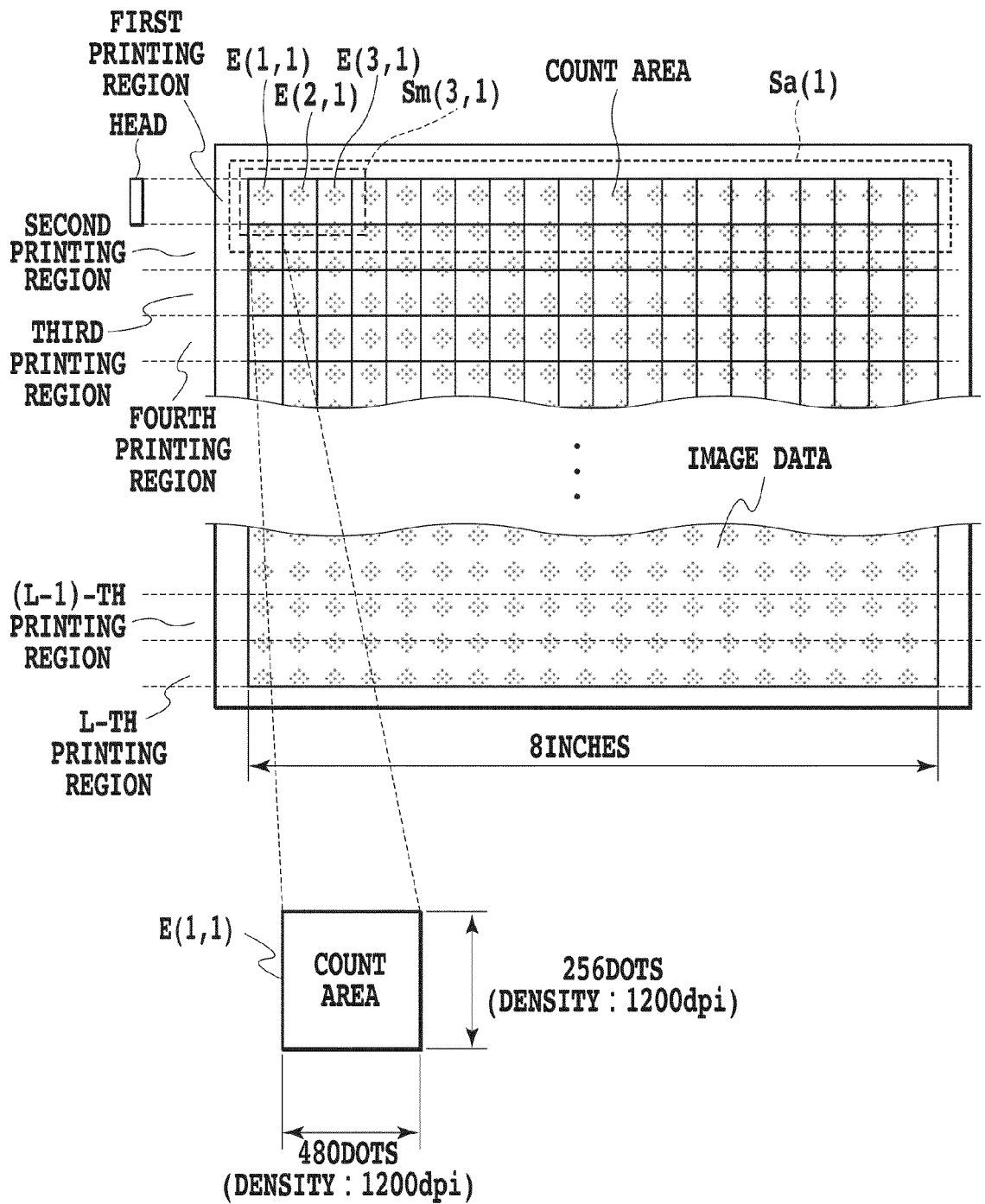
FIG. 22 is a schematic view for explaining a division state of count areas, the number of printed dots on each of which is counted, the count areas being used in the second embodiment thereof.
Figure 23:
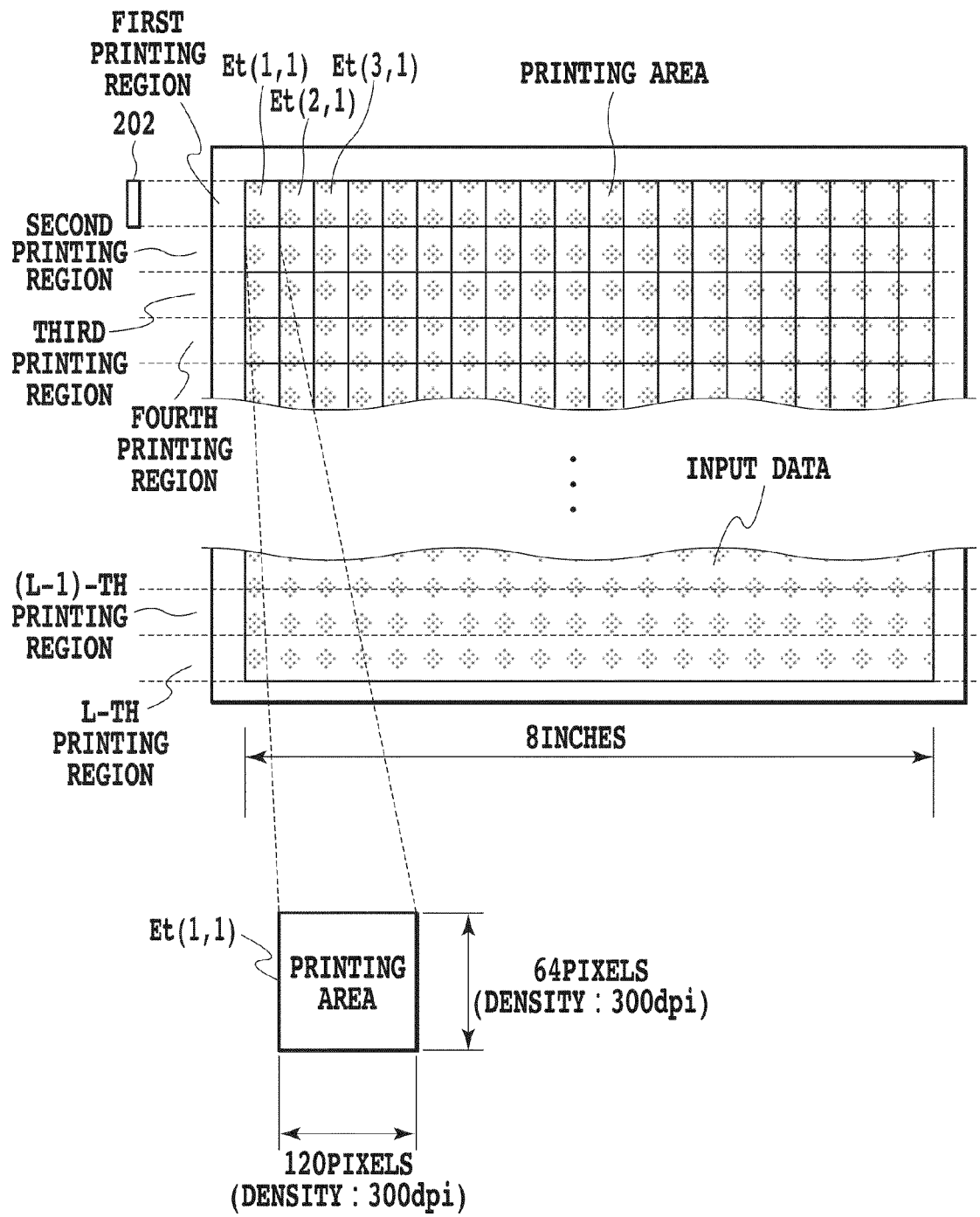
FIG. 23 is a schematic view for explaining a division state of printing areas, the number of dots of print data on each of which is changed, the printing areas being used in the second embodiment thereof.

In this embodiment, as shown in FIG. 22, in the case where printing is performed on the whole printing area, the area being equivalent to, for example, one page of printing media, in l=L times of main scanning, printing data for a single main scanning of an ejection portion are divided in a first main scanning as follows. Specifically, data for (Number of nozzles)×(Number of dots on one line in the main scanning direction) are divided into N pieces (N=1 in FIG. 22) of count areas in the longitudinal direction (nozzle arrangement direction), and M pieces thereof in the lateral direction (main scanning direction). Similarly, as shown in FIG. 23, input image data which correspond to data for (Number of nozzles)×(Number of dots on one line in the main scanning direction) are divided into N pieces of printing areas in the longitudinal direction (nozzle arrangement direction), and M pieces thereof in the lateral direction (main scanning direction).

To be more precise, let us assume that N=1 and M=20. In a case of using a printing head provided with 256 nozzles per ejection portion at a density of 1200 dpi, a 4×4 dot disposition region corresponds to one input pixel with 1/300 inches square. A printing width corresponds to 9600 dots (=8×1200 dpi), and the size of each count area is set to 256 dots long×480 dots wide. A printing area corresponds to input pixels with a size of 64 pixels long×120 dots wide. In each pixel data, any one of the gradation values "0 (=0h)" to "15 (=Fh)" is described, and the gradation values represent the number of dots to be disposed at a dot disposition region, i.e., the number of times of droplet ejection on the region.

Further, for a count result on each count area, Et(m, n) denotes a dot count value which is the number of times of droplet ejection onto a count area located at a laterally m-th and longitudinally n-th position, the number of times of droplet ejection being acquired by counting ejection data with "1"

within the count area. In addition, Sm(m, n) denotes an added-up dot count value which is the added-up number of times of droplet ejection onto count areas located from a laterally first and longitudinally n-th position to a laterally m-th and longitudinally n-th position. Still further, Sa(l−1) denotes a total dot count value which is the total number of added-up times of droplet ejection performed from a printing start up to printing in the last scanning. Each value E(m, n), Sm(m, n), and Sa(l) for a count area, respectively, correspond to the dot count value E(m, n), the added-up dot count value Sm(m, n), and a total dot count value Sa(l) for a printing area. Further, Ht(m, n) denotes an amount of correction to be calculated for each count area or for each printing area.

More specifically, as shown in FIG. 22, a value represented by Sm(3, 1) is a sum acquired by adding E(1, 1) to E(3, 1), the sum indicating the numbers of times of droplet ejection on count areas located at or before a laterally third positions among count areas located at longitudinally first positions. Further, Sa(1) has the same value as Smt(20, 1) which is an added-up number of times of droplet ejection on all the count areas in a lateral direction in a first main scanning. At this time, Sm(3, 1)=Smt(3, 1), and Sa(1)=Sat(1). H(1, 1) represents an amount of correction (number of dots) for print data on a printing area at a laterally first and longitudinally first position.

Figure 24:
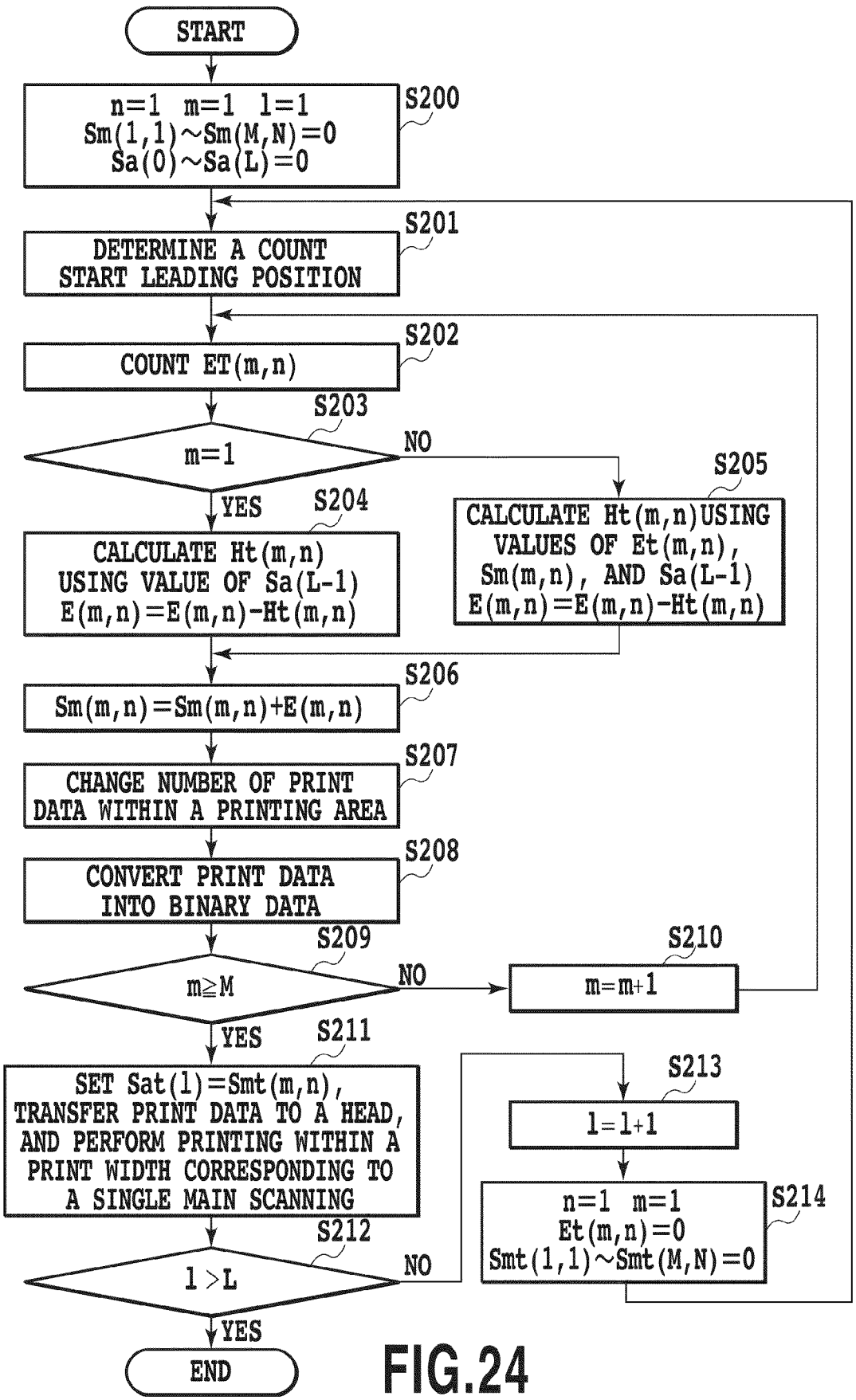
FIG. 24 is a flowchart showing a process for counting the number of dots of print data, and a process for correcting pixel data on the basis of a result obtained by the counting, the processes being performed for each main scanning in the second embodiment of the present invention.

FIG. 24 is a flowchart showing, in this embodiment, a process for counting the number of dots of print data, and a process for correcting pixel data on the basis of a result of the counting, the processes being performed for each main scanning.

This procedure is started for each main scanning. First, in Step S200, a target count area E(m, n) to be processed is defined by setting m=1, n=1, and l=1. Further, a memory area such as a resistor is initialized, in which values of Sm(1, 1) to Sm(M, N), and those of Sa(0) to Sa(L−1) are stored.

In Step S201, a count start leading position of a count area is caused to be the same as a data leading position of first print data.

In Step S202, the number of ejection data "1" within the count area specified by the values m=1 and n=1 at a laterally first position is counted, and a dot count value of the count area is set as Et(1, 1) and temporarily stored in the memory area.

In Step S203, it is determined whether the target count area is at the first position in the lateral direction, i.e., whether the count area is at a leading position in the main scanning direction. If the determination is affirmative, the process moves to Step S204; otherwise, the process moves to Step S205.

In Step S204, a prediction value of an increase of density due to an increase in an ejection amount is calculated on the basis of a count data of the total dot count value Sa(l−1) for ejections performed from a printing start to printing in the last main scanning. The printing main scanning is a first one, i.e., l=1, which means no previous ejection at this time, so that Sat(0)=0. The amount of correction Ht(1, 1) for print data on a count area specified by the values of m=1, n=1 representing a laterally first printing area is calculated. The amount of correction Ht(1, 1) thus calculated is subtracted from the dot count value E(1, 1) of this count area, and the obtained count value is set as a new E(1, 1).

In Step S206, E(1, 1) obtained above is added to a value of the added-up dot count value Sm(m, n) in the lateral direction, and this value is stored as a new value Sm(m, n) in a corresponding memory area.

In Step S107, a correction corresponding to the amount of correction Ht(1, 1) is performed on print data in the laterally first printing area, whereby the numeric values of the print data in the printing area are changed. In this embodiment also, a change of print data is performed in such a way that, for pixels within a printing area, pixel gradation values are changed on the basis of an order indicated by a threshold matrix mask by numerical values corresponding to the amount of correction.

Next, in Step 208, corrected print data within the printing area are transferred to the image signal processor 604, and are converted from multivalued data into binary data using the data converter 618 in the image signal processor 604.

Further, in Step S209, it is determined whether m<M (=20). If m<M, the value of m is incremented by +1 in Step S210 and, thereafter, the count area is shifted by one in the printing main scanning direction. Thereafter, processes in Steps 202 to 210 are repeated, so that a correction is performed on print data within a printing area, and a binary data conversion is performed.

Specifically, for m=2 (<20), in Step S202, a dot count value of a laterally second target count area is first set as Et(2, 1) and temporarily stored in the memory area.

In Step S203, since the target count area is a laterally second one, the process moves to Step S205.

In Step S205, a prediction value of an increase of density due to an increase of an ejection amount is calculated on the basis of three types of count data, i.e., count values Et(1, 1) and Sm(1, 1), and a total dot count value Sat(0) (=0) for ejections performed from a printing start to printing in the last main scanning. In addition, the amount of correction Ht(2, 1) of print data on an area specified by the values of m=2, n=1 representing a laterally second printing area is calculated. Further, a count value obtained by subtracting the calculated amount of correction Ht(2, 1) from the dot count value E(2, 1) within the count area is set as a new E(2, 1).

Subsequently, in Step S206, E(2, 1) obtained above is added to the last added-up dot count value Sm(1, 1) in the lateral direction, and this value is stored, in a corresponding memory area, as a new added-up dot count value Sm(2, 1) in the lateral direction.

In Step S207, a correction corresponding to the amount of correction Ht(2, 1) is performed on print data within a laterally second printing area, whereby the numeric values of the print data within the printing area are changed.

In Step S208, corrected print data within the printing area are transferred to the image signal processor 604, and are converted from multivalued data into binary data using the data converter 618 in the image signal processor 609.

Further, in Step S209, it is determined whether m≧M (=20). If m<M, the value of m is incremented by +1 in Step S210 and, thereafter, the count area is shifted by one in the printing main scanning direction. Subsequently, the processes in Steps S202 to S210 are repeated, so that a correction is performed on print data within the printing area. Thereafter, the processes in Steps S102 to S109 are repeatedly performed for all values of m (1 to M), whereby a correction on print data in a corresponding printing area, and a binary data conversion are performed.

In Step S209, when it is determined that m≧M, the process moves to Step S211. Here, a value (equal to Smt(20, 1) at this time) of the added-up dot count value Sm(m, n) in the lateral direction is set as a new total dot count value Sa(1) (l=1 at this time), and stored in the memory area. Along with this, print data are transferred to a printing head, and printing is performed across a printing width corresponding to a single main scanning. At the same time of this printing operation, a correction process on print data for the next main scanning is started.

In Step S212, it is determined whether l>L, and if l<L, the value of 1 is incremented by +1 in Step S213, and thereafter, a count area is longitudinally shifted by one.

In Step S214, the memory which temporarily stores the count value E(m, n) within the target area and the added-up dot count value Sm(m, n) in the lateral direction among values obtained by counting in the last main scanning is initialized to 0. Thereafter, the processes in Steps S201 to S214 are repeatedly performed, whereby counting of print data, a correction process thereof, and a data conversion thereof into binary data are sequentially performed. With these, ink is ejected through the printing head on the basis of the binarized data, to thereby complete an image.

Further, as in the first embodiment, in this embodiment also, the method in which pixel gradation values are changed on the basis of an order of a threshold matrix mask by numerical values corresponding to an amount of correction can be employed as a correction method of multivalued data. With regard to a threshold matrix mask to be used, the same mask as that of the first embodiment shown in FIG. 13 can be used.

In this embodiment also, the same effect as that of the first embodiment can be obtained. In addition, the same modification as that described in the first embodiment can be made.

Further, this embodiment is effective for use of a printing head with a characteristic that an increase in an ejection amount with respect to temperature is large, i.e., a printing head in which a change in an ejection amount is large with a change in temperature.

In this embodiment, unlike the first embodiment, in the count process for performing a correction, a method in which data (corresponding to the number of times of ejection) after being converted into binary data are counted is used, i.e., binary data, not multiple values, are used. In a case of converting multivalued data into binary data, no linear correspondence exits between multivalued level and the number of binarized dots, in some cases. This is because, for example, in a case of using an error diffusion method, the distributing of errors changes the number of dots to be printed using multi-valued data at respective positions of pixels. Even if another method is used, since a proportion of dots occupying the surface of a printing medium represents a gradation, a dot-overlap effect is incurred. Accordingly, no simple proportional relationship exists between a multivalued level and the number of dots printed. In this connection, by accurately counting the number of dots, even when a printing head in which a change in an ejection amount is large with a change in temperature is used, the change with a change in temperature is further accurately estimated, and the occurrence of density unevenness is effectively suppressed.

In this embodiment, dots are counted after binarization, then multivalued data are corrected, and again binarization is performed. Such processes are performed, because an influence of the thinning of dots on an image, e.g., an influence depending on the positions of dots to be thinned, is taken into consideration. Multivalued data are corrected on the basis of estimation based on a temperature change which has been estimated on the basis of a dot count, and again the corrected data are binarized, whereby it becomes possible to reduce the number of printing dots over a wider area compared with the case where original binarized data are used as they are so as to perform dot thinning, and to suitably disperse the positions thereof.

4. Examples

Next, more specific examples to which the embodiments of the present invention are applied are described.

4.1 Example 1

To Example 1, the same configurations as those of the foregoing printing apparatus (FIG. 2), printing head (FIG. 1), and control system (FIG. 6) are applied, and for the printing mode also, the one-pass printing mode is applied. In a case of using a printing head having an ejection portion provided with 256 nozzles arranged at a 1200 dpi (approximately 21.2 μm) pitch, printing with a printing swath of $^{256}/_{1200}$ inches (approximately 5.42 mm) can be performed on a printing medium in a single main scanning. Further, in the one-pass printing mode, printing medium conveying (sub-scanning) is performed by an amount corresponding to the printing swath.

The printing head is one driven so that 3.0±0.5 pl of ink is ejected through each nozzle. For ink containing color material, a commercially available ink for an inkjet printer PIXSUS 860i (manufactured by Canon Inc.) was used. For a printing medium, A4 size glossy paper (Pro Photo Paper: PR-101 manufactured by Canon Inc.) for inkjet printer was prepared.

Figure 25:
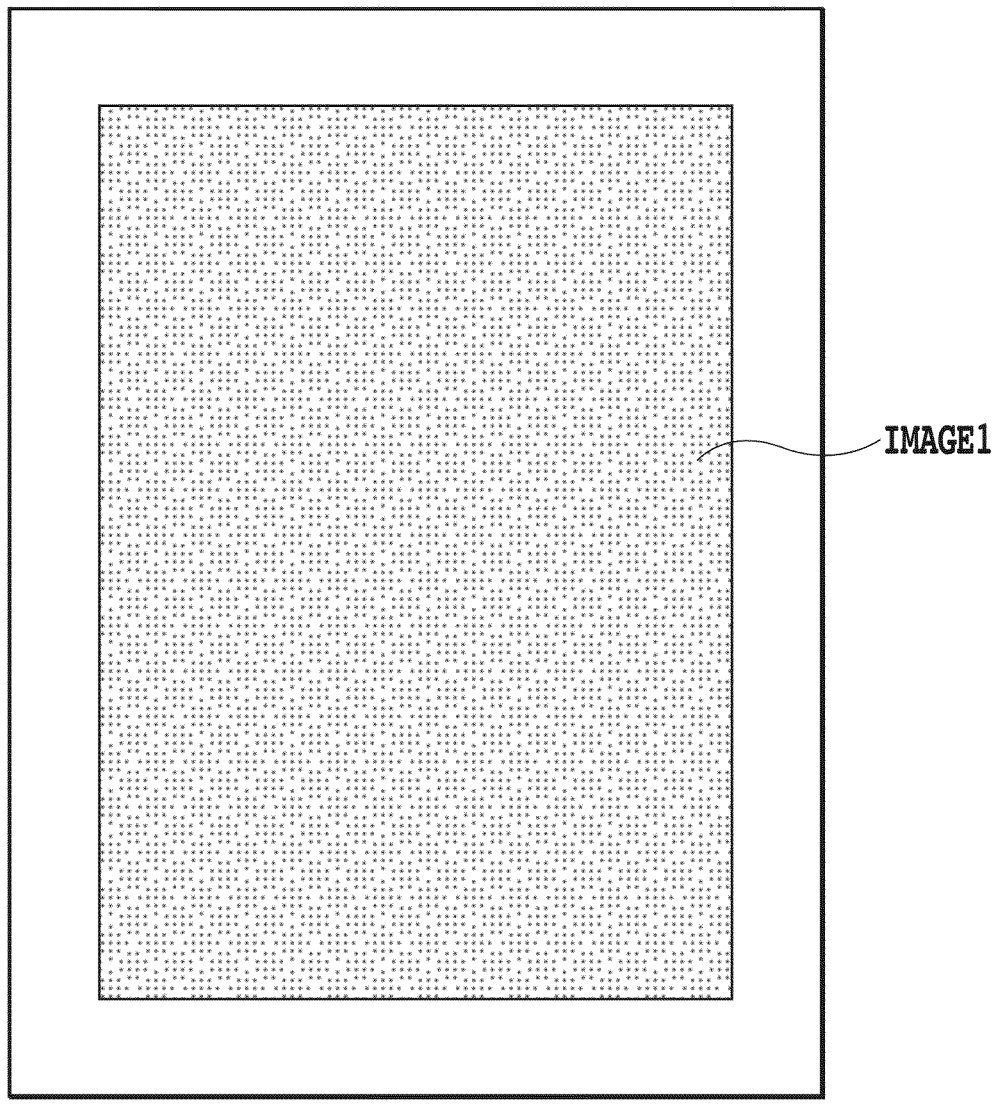
FIG. 25 is a schematic view showing a layout of an image on a printing medium, the image being used in a specific Example 1 to which the first embodiment of the present invention has been applied.

Further, an ink ejection driving frequency was 30 kHz. For an image to be printed, an image 1 with a photographic-like image thereon was prepared. The size of the image is 8 inches×10 inches, or less. FIG. 25 is a schematic view showing a layout of this image 1 on a printing medium.

With regard to an image correction for changing the total number of dots of print data, the correction described in the first embodiment was applied. In the first embodiment, a numeric value is calculated which is to be reduced from an added-up value of gradation values of input image data as an amount of correction. Subsequently, a process in which a gradation value of an arbitrary pixel of input image data is reduced by 1 level is performed, and this process is repeated until the total of reduced values attains a value corresponding to the amount of correction.

Here, for example, as shown in FIG. 26, suppose a case where the number of pixels of input data 2601 is 7680 (=64×120) (300 dpi square per pixel), and an added-up value of gradation values, and a value to be reduced as an amount of correction are calculated to be 40000 and 9000, respectively. Here, the value to be reduced as an amount of correction is larger than 7680. In this case, the following process was performed. Specifically, the gradation values of all 7680 pixels were reduced by 1 level, and as a correction to the remaining 1320 (=9000−7680) pixels, gradation values of the input data corresponding to "0" to "1319" pixel positions of a threshold matrix were further reduced by 1. At this time, data after making a change were those shown by reference numeral 2602, and gradation values at shaded portions were reduced by 2 levels.

Count areas and printing areas used in Example 1 are the same as those described in FIG. 10. In Example 1, printing on the entire printing region is performed by 1=48 times (≈10 inches/($^{256}/_{1200}$ inches)) of the main scanning, and therefore, reference is made to the same drawing, with L set to "48."

In Example 1, for procedures of a process of counting the number of dots (gradation values) of pixel data to be performed for each main scanning, and of a process of correcting the number of dots on the basis of the count value, those explained in FIG. 11 are adopted.

For an area being a printing area located at a laterally first position and specified by m=1, n=1, an amount of correction calculated in Step S104 is Ht(1, 1)=0 dot. Therefore, when a count value acquired in Step S102 is Et(1, 1)=40000 dots, a new count value is Et(1, 1)=40000 dots (=40000−0). In addition, a calculation result in Step S106 is Smt(1, 1)=Et(1, 1)=40000 dots.

Further, for an area specified when m is incremented by 1 in Step S109, let us assume that a dot count value acquired in Step S102 is Et(2, 1)=40000 dots. In addition, when an amount of correction calculated in Step S105 is Ht(2, 1)=9000 dots, a new count value of Et(2, 1)=31000 (=40000−9000) is acquired. Subsequently, in Step S106, the above acquired Et(2, 1) is added to the last added-up dot count value Smt(1, 1) in the lateral direction, whereby a new added-up dot count value in the lateral direction of Smt(2, 1)=71000 (=40000+31000) is acquired. Subsequently, in Step S107, a correction corresponding to the foregoing amount of correction Ht(2, 1) is performed on print data within a printing area at the laterally second position and, whereby, the numeric values of print data within the printing area are changed. However, the amount of correction Et(2, 1) is larger than the number of pixels of the input data 2601. In this case, the process described in FIG. 26 is performed.

The processes described above were applied to the data of the image 1 as in FIG. 25, and were repeated 48 times being the total number of times of printing scanning, thus completing the image 1. The image 1 formed in the above-described manner was found to have favorable image quality, with no visible density unevenness over the entire image, and with no density unevenness in the vicinities of both edges.

4.2 Example 2

The image 1 shown in FIG. 25 was printed under the same condition as that of Example 1, except that, for a threshold matrix mask used for correction, a mask having the configuration of sub-matrices as shown in FIG. 19 was used. The image 1 formed in this Example 2 was also found to have favorable image quality, with no visible density unevenness over the entire image, and with no density unevenness in the vicinities of both edges.

4.3 Example 3

As in the case of Example 1, to Example 3 also, the same configurations as those of the foregoing printing apparatus (FIG. 2), printing head (FIG. 1), and control system (FIG. 6) are applied, and for the printing mode also, the one-pass printing mode is applied. For ink and a drive frequency also, the same ones were used, but for a printing medium, A4 size inkjet plain-paper (Super White Paper: SW-101 manufactured by Canon Inc.) was prepared. For an image to be printed, a graphic image 2 with a photographic-like image thereon was prepared. The size of the image is 8 inches×10 inches, or less.

With regard to an image correction for changing the total number of dots of print data, the correction described in the second embodiment was applied. Specifically, in Example 3, for a correction method for print data, the method in which levels of gradation values of multivalued data are changed is used, whereas for a dot count method for image data, the method in which data after being converted into binary data are counted is used.

Count areas and printing areas used in Example 3 are the same as those described in FIGS. 22 and 23. In Example 3 also, printing on the entire printing region is performed by l=48 times of the main scanning, and therefore, reference is made to these drawings, with L set to "48."

For a process procedure for performing count and correction in Example 3, the one described in FIG. 24 is applied.

Incidentally, for an area being a laterally first printing area and specified by the values of m=1, n=1, an amount of correction Ht(1, 1) calculated in Step S204 is 0 dot. Thus, when a count value E(1, 1) acquired in Step S202 is 50000 dots, a new count value E(1, 1) is 50000 dots (=50000−0). In addition, a calculation result acquired in Step S206 shows Sm(1, 1)=E(1, 1)=50000 dots.

Further, let us assume that, an area specified by incrementing m by 1 in Step S210 has a dot count value E(2, 1) acquired in Step S202 of 60000 dots. In addition, when an amount of correction Ht(2, 1) calculated in Step S205 is 6000 dots, a new count value of E(2, 1)=54000 (=60000−6000) is acquired. In that case, in subsequent Step S206, the above acquired E(2, 1) is added to the last added-up dot count value Sm(1, 1) in the lateral direction, whereby a new added-up dot count value in the lateral direction of Sm(2, 1)=104000 dots (=50000+54000) is acquired. Subsequently, in Step S107, in Step S207, a correction corresponding to the amount of correction Ht(2, 1) is performed on print data within a printing area at the laterally second position and, thereby, the numeric values of print data within the printing area are changed.

The change of print data is performed using the same correction method as described above. At this time, let us assume that a sum E(2, 1) of gradation values within a second count area of input data is calculated to be 60000 dots, and that a value Ht(2, 1) for subtraction as an amount of correction is calculated to be 6000 dots. Now, a process is performed in which gradation values within the second printing area of the input data are reduced from the above E(2, 1) value by an amount corresponding to the value of Ht(2, 1).

To be more specific, as shown in FIG. 27, this process is performed in such a way that gradation values at the respective pixel positions of print data corresponding to the numbers 0 to 5999 based on the order of the threshold matrix mask are reduced by 1 level.

The processes described above were applied to the data of the image 2 and were repeated 48 times being the total number of times of printing scanning, thus completing the image 2. The image 2 thus formed was found to have favorable image quality, with no visible density unevenness over the entire image, and with no density unevenness in the vicinities of both edges.

5. Others

The foregoing various values including the numbers of nozzles and the arrangement densities thereof are merely examples and, hence, it is to be understood that the present invention is not limited to the above-described embodiments. The same is true of the types of ink, or the like.

The present invention is particularly effectively applicable to the case where an inkjet printing method using a heater is adopted, since density unevenness tends to occur due to an influence of a temperature increase caused by a continuous drive. However, when such an influence of a temperature increase caused by the continuous drive is seen, the present invention is still applicable to the case where an element, other than a heater, for generating energy to be used for the ejection of ink is used.

Further, in the above-described examples, all the processes for performing count of print data and correction thereof are assumed to be performed by an inkjet printing apparatus, but at least some of such processes may be performed by an external device such as a computer. For example, with regard to the first embodiment, the external device 1000 may perform counting of image data to be transmitted to a printing apparatus, correct the image data on the basis of the count result, and thereafter, transmit the corrected data to the printing apparatus.

Such a combined use of an inkjet printing apparatus and an external device such as a computer constitutes an invention as a printing system.

In such a case, processes on the side of an external device are achieved by programs such as application software and a printer driver. In this case, a program code itself achieves a novel function of the present invention. Further, the program code itself, and means to be caused to operate by the program code stored in a computer, the program code having been transmitted via communications or from a storage medium to the computer, are included in the scope of the present invention. For printing media for supplying the program code, besides a flexible disk and a CD-ROM, for example, a hard disk, an optical disk, a magneto optical disk, a CD-R, a DVD, a magnetic tape, a nonvolatile memory card, and a ROM can be used.

This application claims the benefit of Japanese Patent Application No. 2007-097712, filed Apr. 3, 2007, which is hereby incorporated by reference herein in its entirety.

The invention claimed is:

1. An inkjet printing method for performing printing by ejecting ink on the basis of image data while scanning a printing head, in which ejection openings for ejecting the ink are arranged, over a printing medium in a direction different from a direction of the arrangement of the ejection openings, the inkjet printing method comprising:
   a counting step of counting the number of ink ejections in a predetermined area among a plurality of areas on the basis of image data for each of the plurality of areas, the plurality of areas being obtained by dividing, in a main scanning direction, a region over which the printing head scans;
   a correction step of correcting the image data included in the plurality of areas on the basis of the number of ink ejections in each of the plurality of areas counted in the counting step to decrease variation in density; and
   a printing step of performing printing by driving the printing head on the basis of image data corrected in the correction step, wherein
   in the correction step, image data included in a predetermined area are corrected on the basis of an added-up value of the number of ink ejections from an area corresponding to a position where the printing head scans, and printing is implemented to the corresponding predetermined area in the scan direction.

2. The inkjet printing method according to claim 1, wherein, in the correction step, positions of pixels to be corrected within the predetermined area are determined on the basis of a the number of ink ejections, and multivalued image data for pixels at the positions thus determined are corrected.

3. The inkjet printing method according to claim 1, wherein,
   in the counting step, multivalued pixel data values respectively for the plurality of pixels included in the predetermined area are added up, and the number of ink ejection is counted on the basis of the added-up value, and
   in the printing step, the printing is performed on the basis of binary data acquired by converting the image data corrected in the correction step, the binary data determining whether or not to eject the ink through the ejection openings.

4. The inkjet printing method according to claim 1, wherein, in the correction step, the correction is performed on the basis of the added-up value associated with the predetermined area for which the correction is carried out, and additionally on the basis of an added-up value of the multivalued image data associated with all other areas located before the predetermined area in the scanning direction, and an added-up value of the multivalued image data included in all scanning regions printed from the start of printing to the last scanning.

5. An inkjet printing apparatus which performs printing by ejecting ink on the basis of image data while scanning a printing head, in which ejection openings for ejecting the ink are arranged, over a printing medium in a direction different from a direction of the arrangement of the ejection openings, the inkjet printing apparatus comprising:
   a counting unit for counting the number of ink ejections in a predetermined area among a plurality of areas on the basis of image data for each of the plurality of areas, the plurality of areas being obtained by dividing, in a main scanning direction, a region over which the printing head scans;
   a correction unit for correcting the image data included in the plurality of areas on the basis of the number of ink ejections in each of the plurality of areas; and
   a printing unit for performing printing by driving the print head on the basis of image data corrected by the counting unit, wherein
   the correction unit corrects image data included in a predetermined area on the basis of an added-up value of the number of ink ejections from an area corresponding to a position where the printing head scans, and printing is implemented to the corresponding predetermined area in the scan direction.

6. The inkjet printing method according to claim 2, wherein, in the correction step, the correction is performed on the basis of the added-up value associated with the predetermined area for which the correction is carried out, and additionally on the basis of an added-up value of the multivalued image data associated with all other areas located before the predetermined area in the scanning direction, and an added-up value of the multivalued image data included in all scanning regions printed from the start of printing to the last scanning.

7. The inkjet printing method according to claim 3, wherein, in the correction step, the correction is performed on the basis of the added-up value associated with the predetermined area for which the correction is carried out, and additionally on the basis of an added-up value of the multivalued image data associated with all other areas located before the predetermined area in the scanning direction, and an added-up value of the multivalued image data included in all scanning regions printed from the start of printing to the last scanning.

* * * * *